(12) United States Patent
Carson et al.

(10) Patent No.: US 8,510,244 B2
(45) Date of Patent: Aug. 13, 2013

(54) APPARATUS COMPRISING ARTIFICIAL NEURONAL ASSEMBLY

(75) Inventors: John C. Carson, Corona del Mar, CA (US); Volkan Ozguz, Aliso Viejo, CA (US)

(73) Assignee: ISC8 Inc., Costa Mesa, CA (US)

( * ) Notice: Subject to any disclaimer, the term of this patent is extended or adjusted under 35 U.S.C. 154(b) by 559 days.

(21) Appl. No.: 12/661,537

(22) Filed: Mar. 18, 2010

(65) Prior Publication Data
US 2010/0241601 A1 Sep. 23, 2010

Related U.S. Application Data

(60) Provisional application No. 61/210,565, filed on Mar. 20, 2009, provisional application No. 61/268,659, filed on Jun. 15, 2009.

(51) Int. Cl.
| | |
|---|---|
| *G06E 1/00* | (2006.01) |
| *G06E 3/00* | (2006.01) |
| *G06F 15/18* | (2006.01) |
| *G06G 7/00* | (2006.01) |

(52) U.S. Cl.
USPC .......................................................... 706/27

(58) Field of Classification Search
USPC ................................................... 706/27, 26
See application file for complete search history.

(56) References Cited

U.S. PATENT DOCUMENTS

| | | | |
|---|---|---|---|
| 4,889,961 A | 12/1989 | Carlson | |
| 5,258,934 A | 11/1993 | Agrant et al. | |
| 5,299,286 A | 3/1994 | Imondi et al. | |
| 5,325,464 A * | 6/1994 | Pechanek et al. ............... 706/41 |
| 5,367,520 A | 11/1994 | Cordell | |
| 5,449,952 A | 9/1995 | Kataoka et al. | |
| 5,515,477 A | 5/1996 | Sutherland | |
| 5,519,811 A | 5/1996 | Yoneda et al. | |
| 5,583,867 A | 12/1996 | Poole | |
| 5,878,025 A | 3/1999 | Tomonaga et al. | |
| 5,889,775 A | 3/1999 | Sawicz et al. | |
| 5,920,664 A | 7/1999 | Hirabayashi et al. | |
| 5,953,588 A | 9/1999 | Camien et al. | |
| 6,052,373 A | 4/2000 | Lau | |
| 6,215,786 B1 | 4/2001 | Larson et al. | |
| 6,289,021 B1 | 9/2001 | Hesse | |
| 6,301,247 B1 | 10/2001 | Larson et al. | |
| 6,317,530 B1 | 11/2001 | Ford | |
| 6,362,974 B1 * | 3/2002 | Lettang ......................... 361/790 |
| 6,389,404 B1 | 5/2002 | Carson et al. | |
| 6,404,043 B1 | 6/2002 | Isaak | |
| 6,829,237 B2 | 12/2004 | Carson et al. | |
| 7,254,565 B2 * | 8/2007 | De Tremiolles et al. ....... 706/28 |
| 2003/0174701 A1 | 9/2003 | Angle et al. | |
| 2007/0239963 A1 * | 10/2007 | Yao et al. ......................... 712/11 |

OTHER PUBLICATIONS

'Low Power analog neurosynapse chips for a 3-d sugarcube neuroprocessor': Duong, 1994, IEEE, 07803-1901, pp. 1907-1911.*

(Continued)

*Primary Examiner* — Kakali Chaki
*Assistant Examiner* — Peter Coughlan
(74) *Attorney, Agent, or Firm* — W. Eric Boyd, Esq.

(57) ABSTRACT

An artificial synapse array and virtual neural space are disclosed.

More specifically, a cognitive sensor system and method are disclosed comprising a massively parallel convolution processor capable of, for instance, situationally dependent identification of salient features in a scene of interest by emulating the cortical hierarchy found in the human retina and visual cortex.

2 Claims, 19 Drawing Sheets

(56) References Cited

OTHER PUBLICATIONS

'A 3-d stacked chip packaging solution for miniaturized massively parallel processing': Lea, 1999, IEEE, 1521-3323(99)04643-2, pp. 424-432.*

'Parallel image analysis on recursive torus architecture'; Matsuyama, 1993, IEEE 0-8186-5420-1, pp. 202-214.*

'Programmable analog vector matrix multiplier': Kub, 1990, IEEE, 0018-9200, pp. 207-214.*

'Elements of artificial neural networks': Mehrotra, 1997, MIT press.*

'Design of an electronic saccadic imaging system': Wong, 2004, IEEE, CCECE 2004-CCGEI 2004, 0-7803-8253-6.*

Gerstel, Optical Fiber Communication Conference Mar. 7-10, 2000 pp. 350-352 vol. 2.

Bewick, Technical Rpt. No. CSL-TR-94-617, Apr. 1994, Computer Systems Lab., Dept. of Electrical Engineering, Stanford University, California.

Thakoor et al. Electronic Hardware, Implementations of Neural Networks, Applied Optics, vol. 26, No. 23, Dec. 1, 1987.

Hecht-Nielsen, Neurocomputing: Picking the Human Brain, pp. 4-13, 4-14, and 4-16.

Duong, et al. Low Power Analog Neurosynapse Chips for a 3-D "Sugarcube" Center for Space Microelectronics, California Inst. of Tech. Pasadena, CA.

Kub, et al. Programmable Analog Vector-Matrix Multipliers. US Naval Res. Lab., Washington DC, USA.

Ramacher, et al. WSI Architecture of a Neurocomputer Module, Siemens, AG, Corporate Res. & Dev., Munich W. Germany.

Aslam-Siddiqi, et al. Nonvolatile Programmable Analog Vector-Matrix, Fraunhofer Inst. of Microelectron Circuits & Syst. Duisburg, Germany.

* cited by examiner

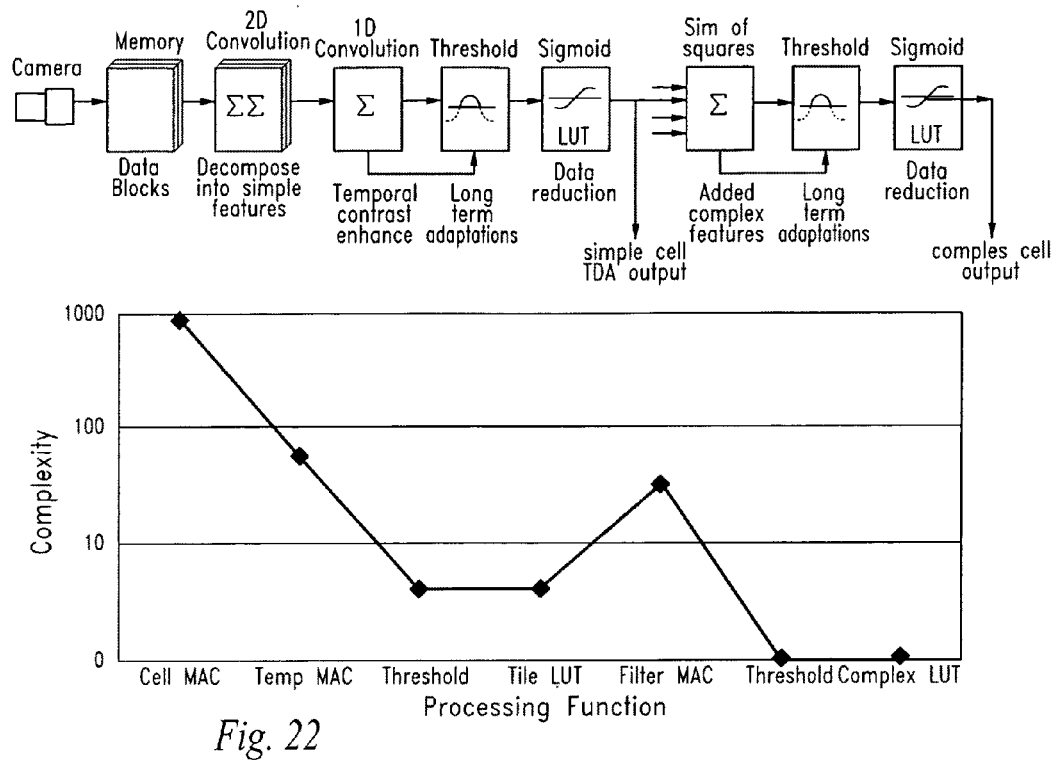
*Fig. 22*
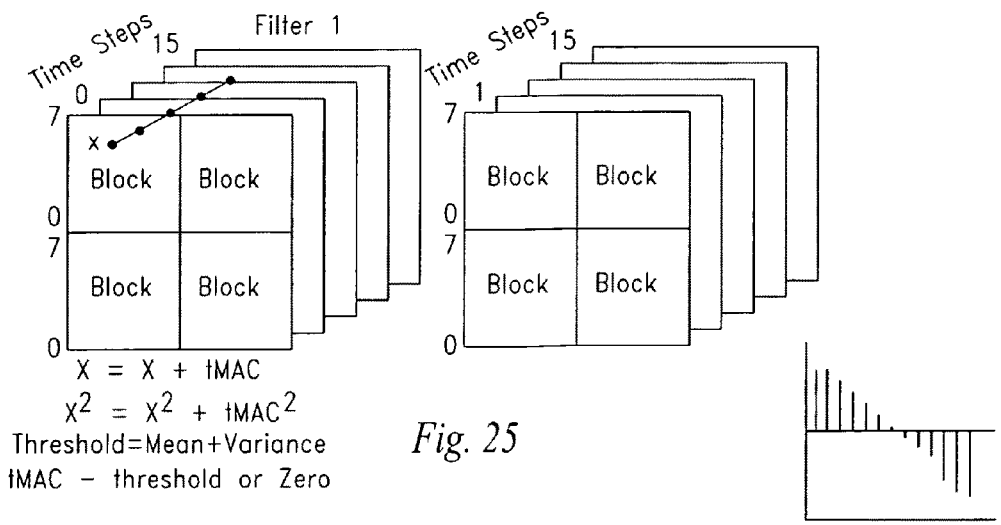
X = X + tMAC
X² = X² + tMAC²
Threshold=Mean+Variance
tMAC — threshold or Zero
*Fig. 25*
*Fig. 24*

| $a_1$ | f (a) | f' (a) | f" (a) |
| --- | --- | --- | --- |
| $a_2$ | f (a) | f' (a) | f" (a) |
| $a_3$ | f (a) | f' (a) | f" (a) |
| $a_4$ | f (a) | f' (a) | f" (a) |
| $a_5$ | f (a) | f' (a) | f" (a) |
*Fig. 26*
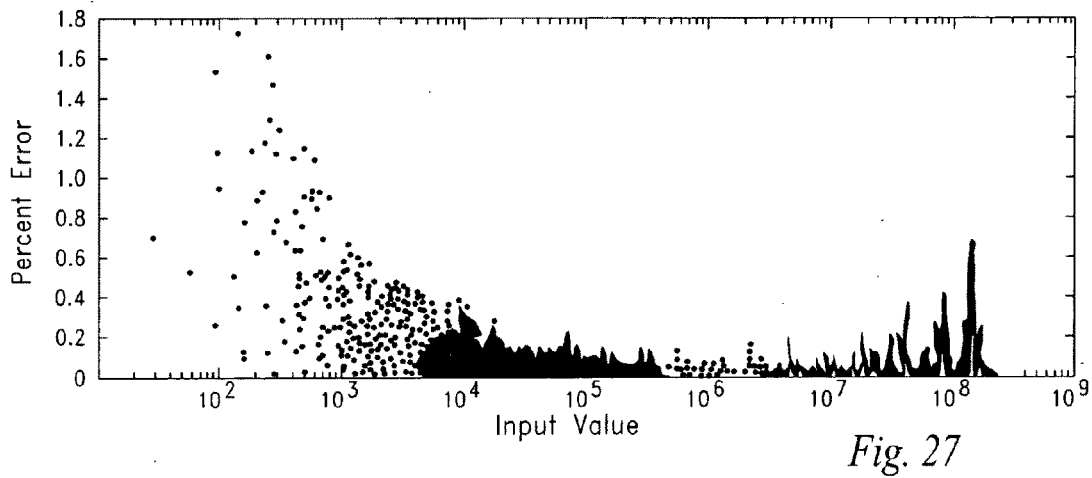
*Fig. 27*
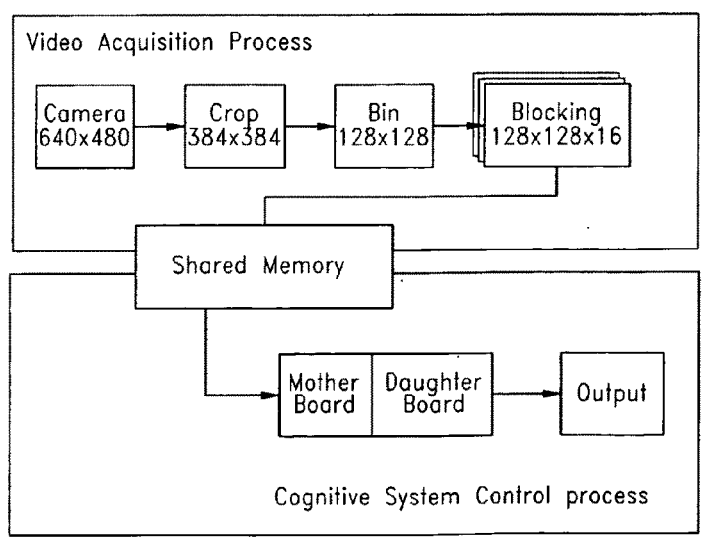
*Fig. 28*

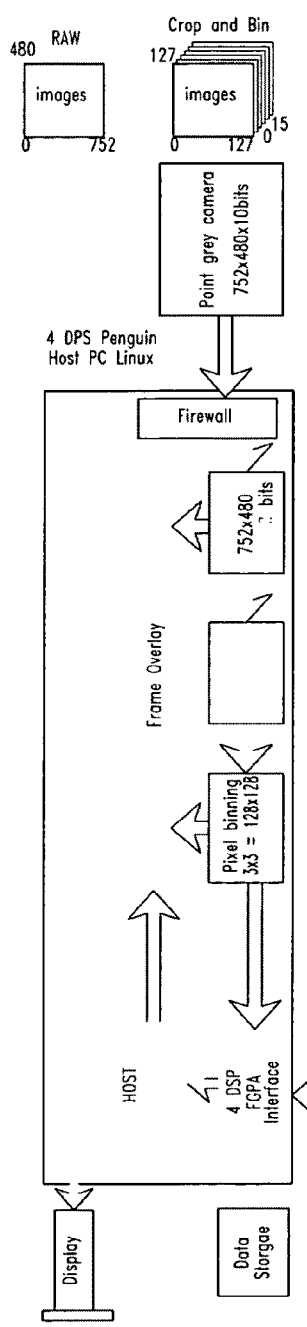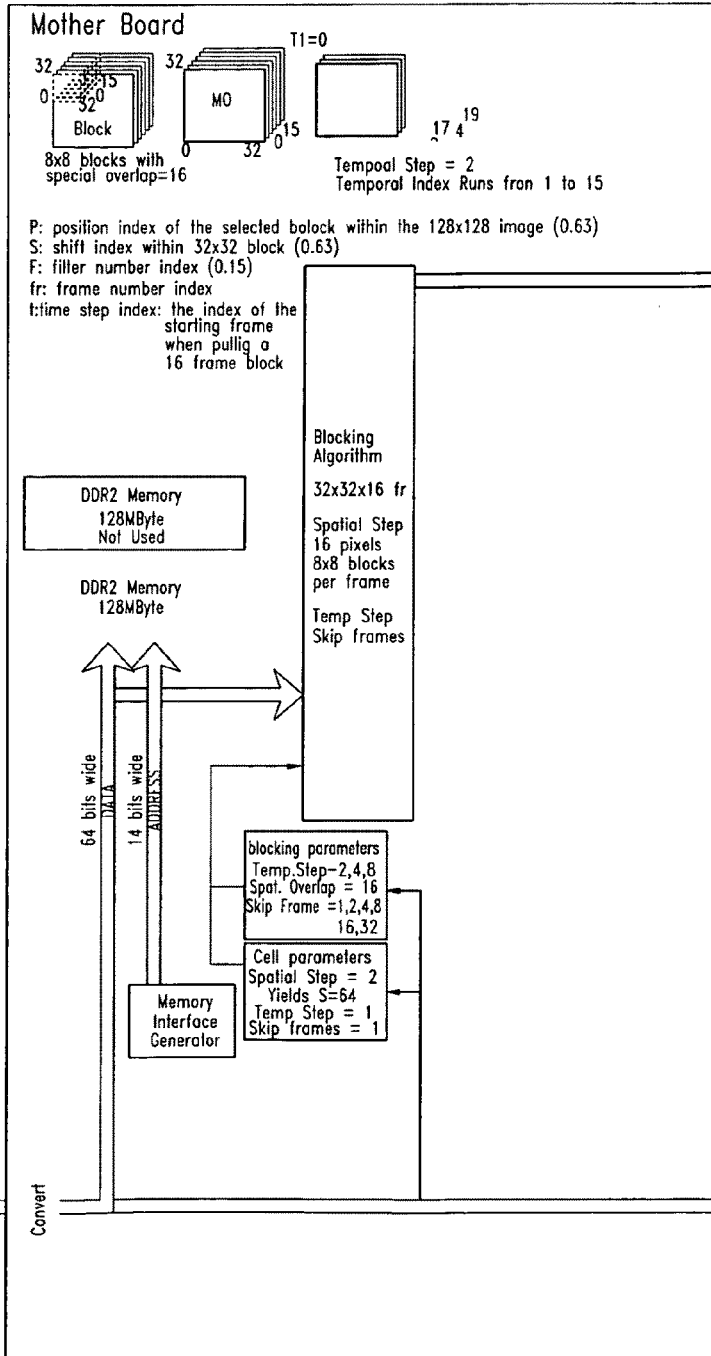
Fig. 29
| Fig. 29A |
| Fig. 29B |
| Fig. 29C |
Fig. 29A

APPARATUS COMPRISING ARTIFICIAL NEURONAL ASSEMBLY

CROSS-REFERENCE TO RELATED APPLICATIONS

This application claims the benefit of U.S. provisional patent application No. 61/210,565, filed on Mar. 20, 2009, entitled "Apparatus Comprising Artificial Neuronal Assembly" and U.S. provisional patent application No. 61/268,659, filed on Jun. 15, 2009, entitled "Massively Interconnected Synapse Neuron Assemblies and Method for Making Same" pursuant to 35 USC 119, both to which priority is claimed and which applications are incorporated fully herein by reference.

STATEMENT REGARDING FEDERALLY SPONSORED RESEARCH AND DEVELOPMENT

N/A

DESCRIPTION

1. Field of the Invention

The invention relates generally to the field of artificial synapse arrays and a virtual neural space that exchanges the relatively slow operation and very high synaptic density of a human brain for the high speed computational operation of an electronic or "virtual neuron" i.e., the invention trades time with neural density space without giving up synaptic connectivity.

More specifically, the invention relates to a cognitive sensor system and method comprising a massively parallel convolution processor capable of, for instance, situationally dependent identification of salient features in a scene of interest by emulating the cortical hierarchy found in the human retina and visual cortex.

2. Background of the Invention

There is a gap between data and information (knowledge) in military intelligence, surveillance and reconnaissance, known as "ISR". The numbers, types and capabilities of the sensors used by all branches of the military service has increased dramatically and the accompanying explosion of data has accelerated faster than the human ability to assimilate it.

There is a need to combine the data output of many sensors into an integrated information system. This need can best be met by placing a form of human-level cognition at the point of data collection where distillation and extraction of knowledge from data becomes an integral part of a sensor system.

Humans achieve cognition with as yet partially understood massive, yet subtle, interactive mixed mode set of parallel operations. Prior art architectures do not effectively exploit the computational capabilities provided by advances in electronics. New architectures and hardware elements are disclosed herein that exploit the intrinsic capabilities of CMOS technology and the growing understanding of how humans perform cognition whereby cognitive sensor systems are realized.

As reflected in FIG. 1, the invention provides a cognitive sensor system with limited size, weight and power that is capable of transforming data from an imaging sensor suite (e.g., visible, IR, active/passive) into communicable knowledge. The invention provides the ability to, among other things, implement an imaging sensor capable of recognizing and tracking a selected object by saccading and foveating along with the movement of the object. Such a system may desirably be used in unattended moving platforms such as UAVs or UGVs to support their navigation and surveillance needs. The invention provides a cognitive ISR system capable of generic object and relationship recognition and classification, e.g., a round object is a tennis ball, bowling ball or a basketball, in general, a "ball" and not an orange.

Data is different from information or knowledge. Most military surveillance systems acquire and track thousands of objects with hundreds of networked sensors and data processors. Current development trends for these platforms are to collect data, compress the data to reduce communication bandwidth and transfer collected data to command posts. Human operators then revise data accumulated at the control center, decision-making is performed and commands are sent using remote links for action taking.

Unless the collected data is processed and reduced to information (or knowledge which is the identified contents of the data), it doesn't provide any meaningful value. Data transmission requirements impose size and power constraints and can make the platform detectable (vulnerable).

Another drawback is the amount of collected data as illustrated in FIG. 2. A typical imaging sensor collects almost 1 Gb of data every second. One UAV generates about 6,000 images per hour and JSTARS generates 10,000 s of target reports per second. A trained operator can only process 1.0 to 30 images per hour (1M pixel SAR image, for example) or track 3 to 6 targets per second. The transformational communication mantra "eliminate bandwidth constraint" is good for moving data but not practical for knowledge acquisition. The better approach is to keep the "human" in the loop but transfer knowledge instead of raw data.

A cognitive sensor system as a human-like knowledge generator at each ISR node addresses the above deficiencies.

Such a system is capable of providing omnipresent surveillance by large networks of installed cameras and constellations of UAVs or UGVs as evidenced by the following excerpt:

"Any future concept for command and control in 2015-2020 must accommodate and exploit the information and other technologies expected to exist at that time. The number, type and capabilities of technical sensors will increase dramatically and management of them will be a formidable challenge. Information of all types will continue to grow exponentially, from sensor information about potential enemies or neutrals to self-reporting status information from friendly units and platforms. This explosion of information will accelerate faster than the unaided human ability to assimilate it; increasing the already significant need for effective information management. This imperative for information management will include a need for synthesizing the products of the wide variety of emerging sensor technologies into an integrated information system. This synthesis will be difficult because many of these technologies are highly complex and may exhibit very different informational physics." (Draft ForceNet Concept Document, V. 1.3.4, November 2004, p. 20)

The applications for a small, low-power machine with the capabilities of sensing and decision making with natural language interface are undoubtedly military but commercial applications will follow. The invention has at least three well-suited military applications:

1. Smart weapons: Future generations of Unmanned Combat Air Vehicle (UCAV) or Unmanned Ground Combat Vehicle (UGCV) platforms to enable supervised autonomous operation situation awareness, threat and target identification and destruction without remote intervention.

2. Intelligent Surveillance and Recognition: Future generations of reconnaissance and targeting vehicles and platforms (e.g., urban warfare robots) for tactical multisensory (e.g., vision, thermal, acoustic, chemical and olfactory) "perception" and supervised autonomous operation.
3. Unmanned Sensors: Distributed sensors operating in hostile environments to collect threat data, to assess damage and to assist troops in operation by augmenting their sensing.

For DOD applications, functions such as "go-and-report" can be accomplished without compromising personnel in critical and hostile environments. Autonomous unmanned weapon systems and smart munitions to achieve surgical search-and-destroy operations can be provided. Wearable "recognition assistants" may augment the sensory awareness of the military personnel in areas with limited human sensory capabilities (e.g., seeing and recognizing in dark or responding to olfactory threats).

Missile defense systems with an order-of-magnitude faster response time can be realized. Unmanned sensor networks for assessing threat levels or damage levels in hostile environments can be implemented. The intelligence at the source can be used to recognize and report suspicious behavior.

Cognition is the act of knowing. Although Moore's Law is at the threshold of human level computational capabilities in terms of arithmetic operations per second per watt per cubic centimeter, prior art architectures do not effectively exploit these computational capabilities. If these architectures are replaced with the disclosed neuromorphically-inspired architectures to exploit the intrinsic capabilities of CMOS technology along with the growing understanding of how humans perform cognition, cognitive systems are provided as generally shown in FIG. 3.

Three key attributes are desirable to implement the cognitive architectures of the invention.

1. Integrated Sensorium: Different cognitive functions (perception, learning, reasoning, memory, etc.) do not operate in isolation. Cognition requires not only intensive data sharing between computational elements within a cognitive module but also input from sensors and output to actuators. A conventional computer in isolation cannot achieve cognition which requires that sensorium, communication and action be seamlessly integrated (architecture, software and hardware).
2. Hardware support: To match human cognition, there is a need for more than the equivalent 10 peta-ops performance with at least 100 peta-bytes of associative memory. It is noted however that even a fraction of the above stated performance could perform useful cognitive tasks if the hardware is not in isolation from sensorium.
3. Cognitive Algorithms: Digital computers fall far short of nature's ability to perform cognitive processing algorithms for simple cognitive tasks such as face recognition, which are well performed, even by young children. A strong coupling between hardware and algorithms is desirable.

An easily understood example of how the complex cognition act takes place in humans is to use the eye-brain example. The cognition process is massively parallel and hierarchical with few steps (most times not to exceed six steps). The cognition process involves about $3 \times 10^{10}$ neurons, $3 \times 10^{14}$ synapses performing the equivalent of many 8-bit multiply-and-accumulate (MAC) functions at the synaptic level, at a 100 Hz operation for a total of $3 \times 10^{16}$ MACs sustained at less than 10 Watts of power.

A key feature of brain functionality is the combination of a fast feed-forward path along with massive feedback such as is seen in FIG. 4. This operational path allows a 10:1 increased feedback input during a hierarchical selection process by selecting areas of initial match quickly and by eliminating surrounding data for fast convergence by hypothesis testing.

Another key aspect of the eye-brain processing is the saccading and foveating functionality. The brain handles only a small part of the visual field with full details. The remaining field-of-view is tracked only for motion and intensity changes. The eye saccades continuously to cover large fields. In each saccade, only a small area, the fovea, is analyzed for recognition. The saccading and foveating functions, managed by saliency and attention, allow the brain to maintain cognitive functions in a large field of view without increasing required resources exponentially.

It is has been determined that brain processing is performed in a "columnar" fashion as generally shown in FIG. 5. Each column has about 6-layers and can be specialized to perform selected functions or dedicated template matching tasks.

For example the following is observed:
1. Thalamocortical circuits 1: clustering, hierarchies
2. Thalamocortical circuits 2: sequences, chaining, hash codes, match filters
3. Striatal complex/basal ganglia: reinforcement learning
4. Hippocampal fields: time dilation/compression
5. Amygdala nuclei: filters, toggles The brain's columnar organization allows the input data to be distributed in a space invariant scheme both vertically (realignment and data to information process) and horizontally (multiple match filters for data elimination) for efficient recognition as reflected in FIGS. 6 and 7. (Use of columnar and hierarchical processing in the brain for space-invariant recognition-adapted from Granger). The columnar structure further allows for a very efficient hierarchical processing.

In the example, the letter "A" is recognized based on its components. Since each layer checks matches to specific orientation of segments, few matches can point to multiple variations of the letter A. The hierarchical matches allows for spatial invariance.

Critical neural circuits underlying the brain operation are better understood now. For example, Koch gives a complete treatise of neural models in his book "Biophysics of Computation" (Koch 1999). More functional models are developed by Bartlett (Bartlett, 2003). Signal flow is modeled by Carpenter and Grossberg (Carpenter 2002).

The dilemma is that the effort of achieving synaptic arithmetic logic densities in current CMOS technologies results in a $10^6$-$10^7$ shortfall compared to human wet chemistry (i.e., the brain) ($10^6$ vs. $10^7$). However, at the same power density, CMOS is $10^6$-$10^7 \times$ faster than wet chemistry ($10^9$ Hz vs. 100 Hz).

Therefore, the solution is to trade time with space and to create a "virtual neuron" by rapidly changing synaptic weights using time-division multiplexing. In this manner, virtual neurons can "talk" to each other simultaneously by keeping the information flow in time coordinated as though they were in a real brain. The changes in the synaptic weights can occur at a very high clock rate with limited numbers of neural nodes and synaptic junctions. The time-division multiplexing can be used to lower fan-in/fan-out requirements to create large connectivity by circulating data faster.

Three-dimensional microelectronic technologies such as those developed by Irvine Sensors Corp., assignee herein, are ideally suited to implement certain preferred embodiments emulating similar, structures. Thinned and stacked integrated circuit chips are well suited to emulate the highly integrated neural circuitry of the brain. These circuits are basically weighted synapse arrays terminating in neurons connected to other arrays. Crossbar switches in each chip enable all possible interconnects within and between stacks. A bus and control plane analogous to the brain's mid-line plane separates the two halves of the stacked circuits and provides clock signals, ground, power and inter-lobe communications. Input and output is via this plane. Data fields from sensor arrays are passed through stages of high-speed template matching. Those resulting in matches or mismatches are fed back to the weight spaces to improve or degrade the match. Failure to do either results in the creation of new templates. All significant results are stored in long-term memory embodied in, for instance, solid-state, non-volatile flash memory stacks.

A numerical example is as follows. Assume that the goal is to implement a total number of neurons $n_T$. The total number can be achieved by:

$$n_T = n \times f_c \times T_F$$

where n is the number of electronic neurons, $f_c$ is the clock rate and $T_F$ is the frame time.

Typical values are: n=128, $f_c=10^9$, $T_F=0.01$ second which lead to the total number of neurons, $n_T$ of $1.28 \times 10^9$.

Each neuron must have access to $10^4$ other neurons to fully emulate the brain. It will typically take more than one cube to carry out the emulation of the brain. For example, to emulate layers from V1 to V5 (or IT), it would generally require about a total of 10 cubes of stacked microelectronic circuitry, preferably in the form of five transverse-mated pairs of cubes interconnected such as is disclosed in U.S. Pat. No. 6,829,237, entitled "High Speed Multi-Stage Switching Network Formed From Stacked Switching Layers" to Carson et al.

Using the low latency and massive interconnection capabilities of three-dimensional interconnects including, without limitation, the use of transverse-mated stacks and fast SRAM technology, it is possible to emulate portions of the human brain and visual cortex in CMOS.

Neurons basically perform template matching in the form of 50-500 parallel multiply and accumulate (MAC) operations. It is believed that roughly a trillion synapses at 100 Hz generate the equivalent of 10 peta-ops computation rates. This is done at about 10 watts of power dissipation in less than a liter volume. Fortunately for most cognitive activities, the precision required is less than 8 bits, which is consistent with analog MAC operations. Therefore, a low power arithmetic logic is at the very core of cognition. Low-power CMOS technology, with leakage currents about 1000 times less than the high performance processes, allow the replication of this facet of human capability at, for instance, the 65-90 nm design-rule mode.

The cognitive sensor system of the invention is based on the following attributes, derived from the large amount of ongoing neurobiological research in the field:

1) Neuron model: hybrid digital-analog with local associative memory and multiply-and-accumulate functions; small set of hard-wired but reconfigurable functions.
2) Synaptic model: local adaptable, weighted, hardwired connections and long distance switched interconnects with adaptive losses to support time-dependent and resonant signal propagation. Time dependent changes to reflect multiple synaptic connections (100-1000 s) in a small number (10-100 s) of physical connections.
3) Signal model: low power analog arithmetic logic and maximum utilization of available information-carrying capability of signals; multi-level, multi-domain representation to exploit large representation space with a smaller number of physical signals.
4) Signal flow: Bi-directional signal flow for resonance-based processing and streaming vertically within a layered structure with horizontal communication in few layers; fast feed-forward path in addition to a regular feed-forward path to allow for selective and anticipating (predicting) feedback; resonance enhancement for stability.
5) Functional model: High-level auto-associative computing architectures based on resonant signaling; multiple levels of hierarchical distributed memory based on recursive memory.
6) Application model: Hypothesis testing using a fast auto associative model to predict future events by analogy to past events.
7) Application model: High-level verbalization (language) for context processing and cognition with unsupervised learning capability.
8) Application model: Goal-based learning by hypothesis testing.
9) Control model: Distributed digital control with centralized decision making (result for cognition, hypothesis testing) for instructability and controllability.

The hardware implications of such disclosed architectures involve the realization of cognition which involves real-time hypothesis testing at the sensor site; that is feedback of possible sensory input interpretations back to the sensors to test for "goodness of fit" seamlessly.

As better seen in FIG. 8, the bi-directional signal flow that results in a resonant mode is a key enabler for this new class of architectures.

The proposed solution for the problem as described above is taking advantage of the higher clock speeds available in CMOS and reusing the same physical hardware many times during each basic operation using time-multiplexing and reconfigurable synapse connections to create a large "virtual neuron" assembly.

Overall, a method for providing a virtual neural space is disclosed generally comprising providing an electronic synapse array comprising a plurality of synapse array inputs, multiplication means, addition means and storage means for storing and outputting a plurality of changing synapse weight inputs where the array is capable of having a first synaptic connectivity state at a first time state and is capable of having a second synaptic connectivity state at a second time state, changing the first connectivity state to the second connectivity state while remembering, storing and using information from the first connectivity state to provide an array data set and outputting said array data set after a time integration step to a storage node. The disclosed invention comprises adaptive, reconfigurable synapses and synaptic connections and adaptive plastic (reconfigurable weights, time-multiplexed) connection points between synapse nodes to achieve very high fan-in and fan-out connections.

Further, a method is disclosed for providing a virtual neural space comprising providing an electronic synapse array comprising a plurality of electronic neurons, multiplication means, addition means and storage means for storing and outputting a plurality of changing synapse weight inputs, selected ones of said neurons having a time-dependent connectivity with selected other ones of said neurons by means of at least one time-dependent synapse, i.e., wherein circuit means are provided whereby one or more synapses exist between selected neurons in a first time state and whereby one or more different synaptic connections between the same selected neurons are created or eliminated, enhanced or inhibited using weight data (e.g., selectively enabled or disabled) in a second time state.

In other words, one or more selected synaptic connections are reconfigurable to create different connections or weights of connections between one or more neurons in different time states.

The use of 3D implementation using transverse-mated stacks allows for efficient fan-in/fan-out connections in one embodiment. In another embodiment, the use of a hierarchal architecture in a set of convolution processors or cells configured in a NEWS network is disclosed wherein a plurality of cells comprise a tile and wherein a plurality of tiles comprise a supertile, all having a root processor overseeing communication and control functions between the various elements.

For instance, in a first aspect of the invention, a method of electronically emulating a neural space is provided comprising: 1) providing a first data input signal and a second data input signal, 2) providing a synapse array comprising a plurality of nodes and a plurality of weight spaces, 3) associating a predetermined first weight in a first weight space with said first data input signal using time-division multiplexing and associating a predetermined second weight with in a second weight space with said second data input signal using time-division multiplexing for the selective emphasizing or deemphasizing of said data input signals in, for instance, an N×M or N×N analog current mode multiplier array, 4) multiplying said first data input signal with said first weight in the analog current mode domain to produce a first node output comprising a first product, 5) multiplying said second data input signal with said second weight such as in the analog current mode domain to produce a second node output comprising a second product, 6) adding said first product and said second product to produce a convolved output, 7) comparing said convolved output with a predetermined template to define a template match or template mismatch, 8) and feeding back said template matches or template mismatches to at least one of said weight spaces at least once to improve or degrade said template match or mismatch.

In a second aspect of the invention, an electronic neural space is provided comprising: 1) means for receiving a set of data signals, means for associating a predetermined weight in a weight space with each of said data signals for the selective emphasizing or deemphasizing of said data signals in an N×M or N×N analog current mode multiplier array wherein a plurality of said nodes comprise a memory cell for the receiving of at least one data signal and at least one weight data, 2) means for multiplying a plurality of said data signals with at least one of said weights in the analog current mode domain to produce at least two products, 3) means for adding at least two of said products to produce a convolved output, 4) means for comparing said convolved output against a predetermined template to define a match or mismatch, and 5) means for feeding back said convolved output to at least one of said weight spaces to enhance or degrade said match or mismatch.

In a third aspect of the invention, an electronic neural space is provided further comprising control logic for interface to saccading and foveating means.

In a fourth aspect of the invention, an electronic neural space is operating in the sub-threshold CMOS region.

In a fifth aspect of the invention, an electronic neural space is provided wherein a digital to analog converter receives data from said memory.

In a sixth aspect of the invention, an electronic neural space is provided further comprising a Gilbert multiplier.

In a seventh aspect of the invention, an electronic neural space is provided further comprising a four-quadrant Gilbert multiplier.

In a eighth aspect of the invention, an electronic neural space is provided further comprising at least two transverse-mated stacks comprising a plurality of layers of microelectronic circuitry.

In a ninth aspect of the invention, a cognitive sensor circuit for the emulation of the visual cortex of a human brain is provided comprising: 1) a first supertile and a second supertile, 2) said first and second supertiles comprising a plurality of tiles and comprising a supertile processor, supertile memory and a supertile look up table, 3) said first supertile in electronic communication with said second supertile, 4) said tiles comprising a plurality of cells and comprising a tile processor, tile memory and a tile look up table, 5) selected ones of said tiles having a plurality of tile mesh outputs in electronic communication with selected other ones of said tiles, 6) said cells comprising dedicated image memory and dedicated weight memory and convolution circuit means for performing a convolution kernel mask operation on an image data set representative of a scene, 7) selected ones of said cells having a plurality of cell mesh outputs in electronic communication with selected other ones of said cells, 8) root processor circuit means for managing electronic communication between said cell mesh outputs, said tile mesh outputs or said supertile mesh outputs.

In a tenth aspect of the invention, a method for emulating the visual cortex of a human brain is provided comprising: 1) providing at least one supertile comprised of a first tile and a second tile, 2) said first tile comprising a plurality of first cells and said second tile comprised of a plurality of second cells, 3) at least one of said plurality of first cells and at least one of said plurality of second cells comprising a plurality of cell mesh outputs wherein selected ones of said plurality of first cells are in communication with selected other ones of said second cells, 4) providing an image data set representative of a scene, 5) selecting one or more predetermined image data subsets from said image data set, 6) receiving said one or more image data subsets to a first cell and to a second cell, 7) performing concurrent convolution kernel mask operations in each of said first and second cells on said image data subsets to provide a plurality of convolved cell outputs.

BRIEF DESCRIPTION OF THE DRAWINGS

FIG. 22 is a simplified block diagram of the steps in a cognitive system according to the invention.

FIG. 24 shows the temporal filter 16×1, zero mean and weight toward initial frames.

FIG. 25 shows the threshold computation in a preferred embodiment of the invention.

FIG. 26 illustrates an exemplar mathematical look-up table or LUT.

FIG. 27 is a graph of the accuracy results for the 32-bit LUT implementation of the square root.

FIG. 28 reflects a block diagram showing the video acquisition process.

DETAILED DESCRIPTION OF THE INVENTION

Figure 1:
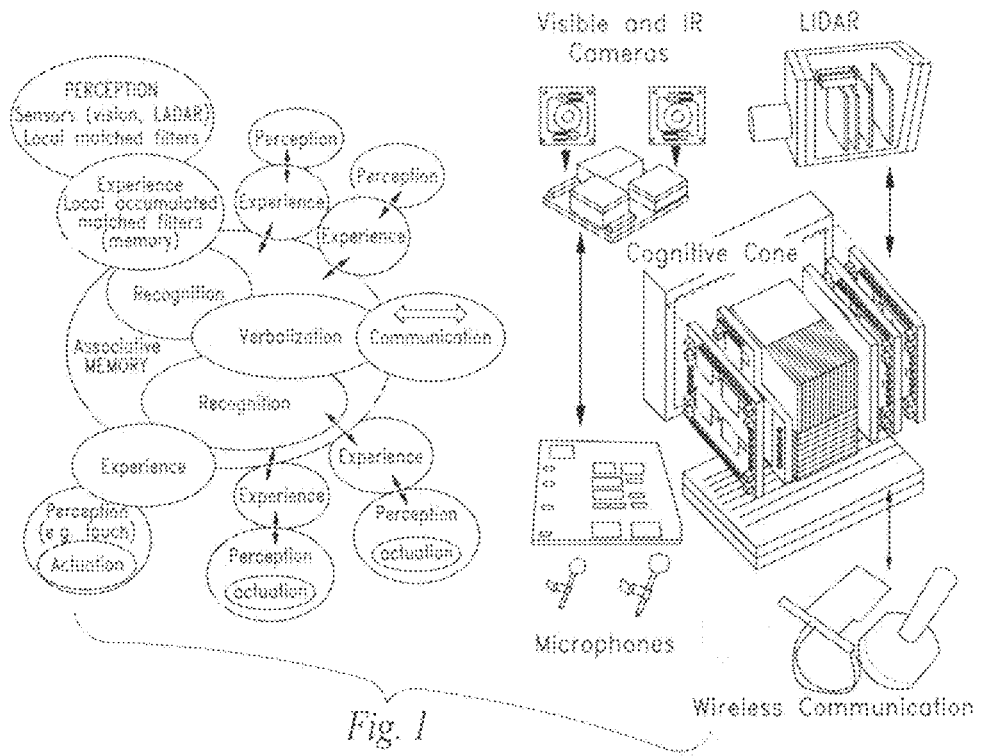
FIG. 1 is an illustration of a preferred embodiment of the cognitive system architecture and 3D technology implementation of the invention.
Figure 3:
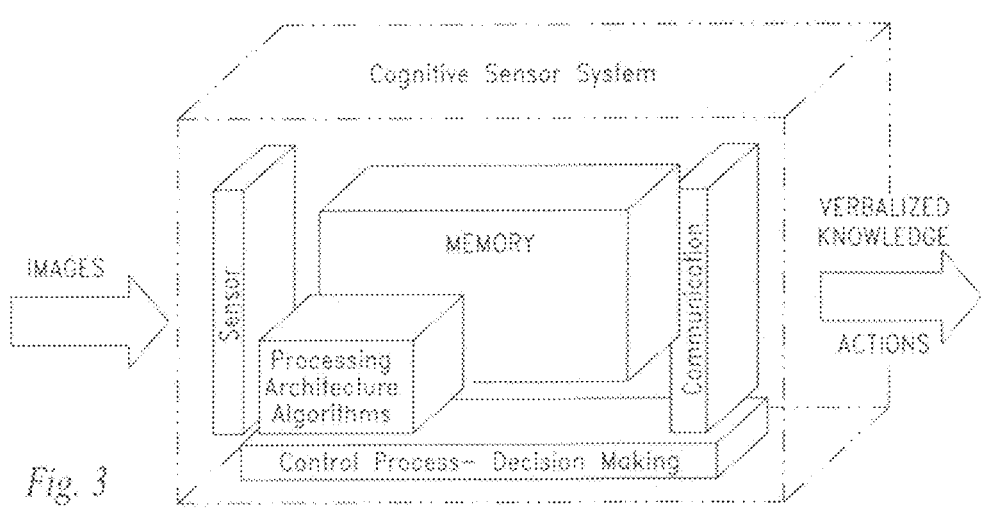
FIG. 3 is an illustration the primary elements of the cognitive sensor system of the invention in a block diagram.
Figure 2:
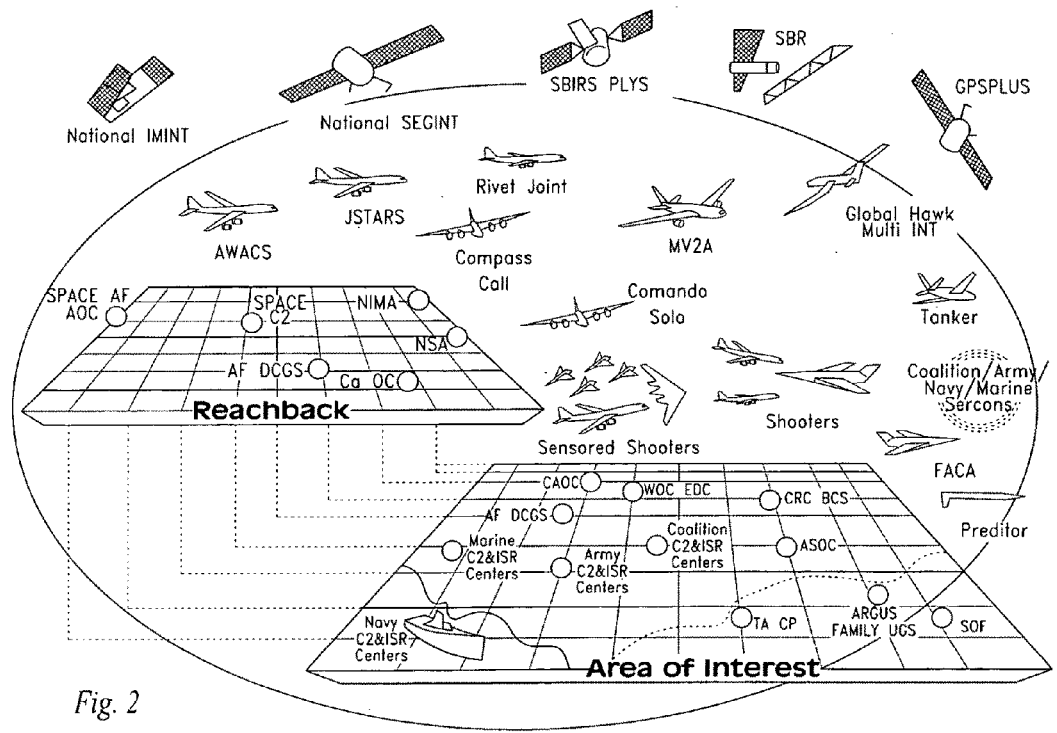
FIG. 2 shows various applications for the disclosed invention.
Figure 4:
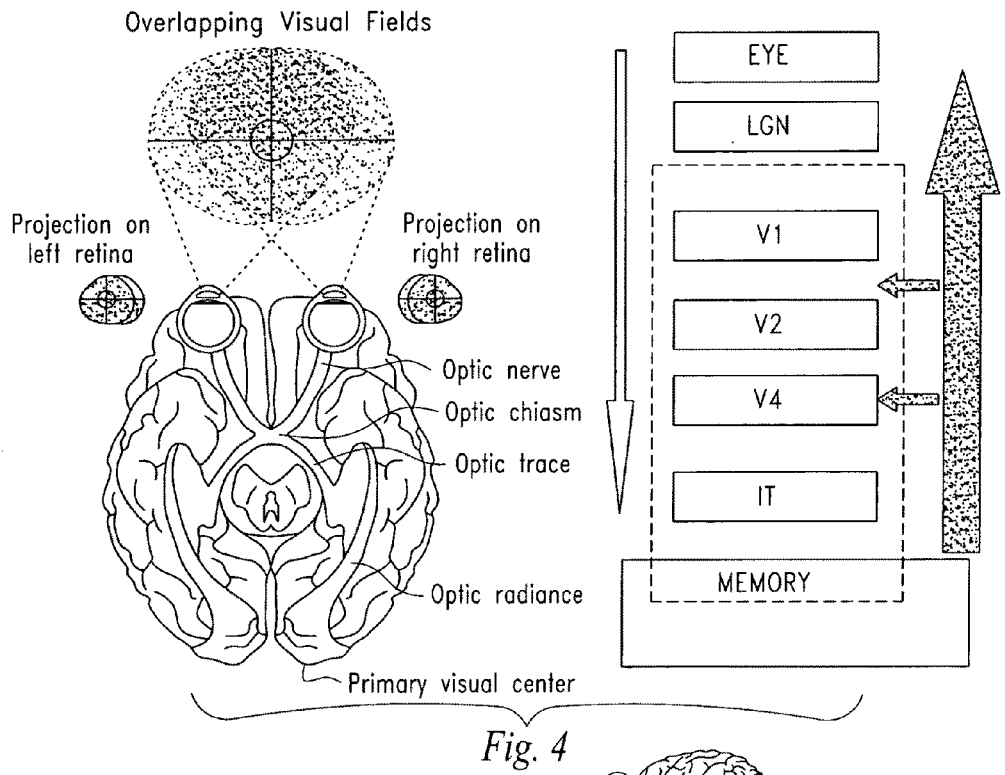
FIG. 4 illustrates the eye-brain fast feed-forward loop and feedback loop.
Figure 5:
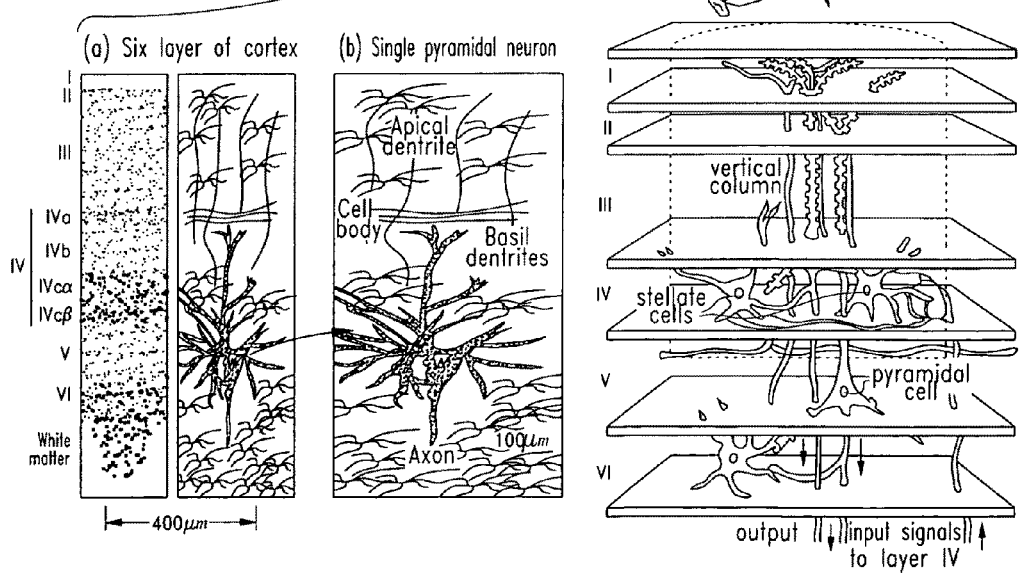
FIG. 5 shows a portion of the columnar structure of the human brain.
Figure 6:
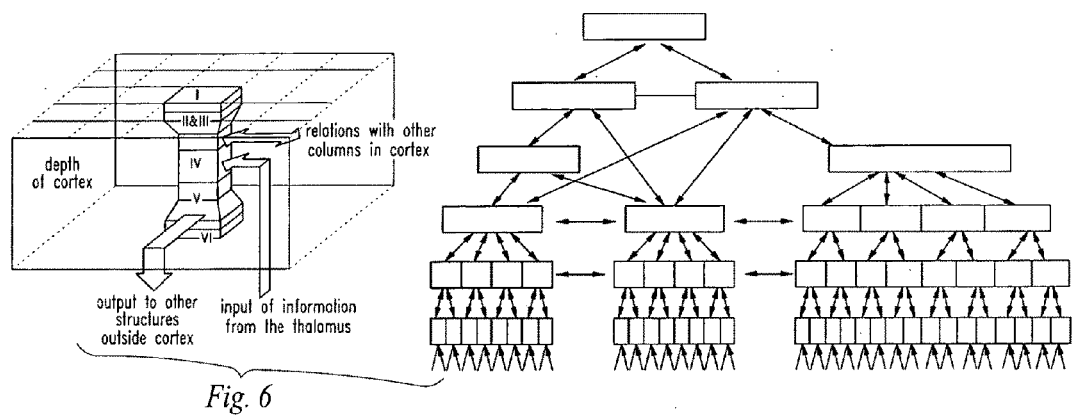
FIG. 6 reflects the columnar and hierarchical processing in the human brain.
Figure 7:
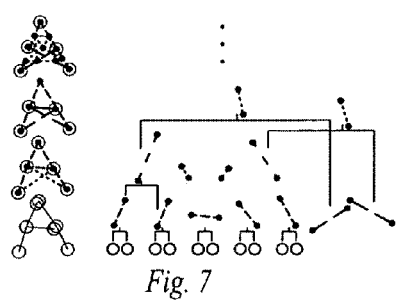
FIG. 7 is a further illustration of the use of columnar and hierarchical processing in the human brain for space-invariant recognition.
Figure 8:
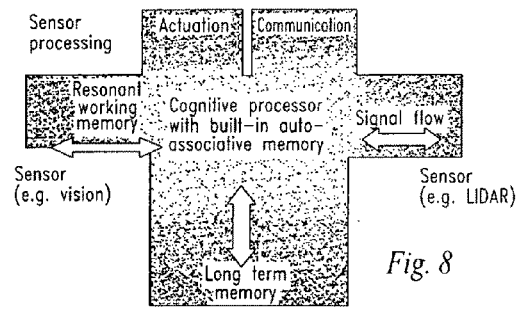
FIG. 8 is a block diagram of the disclosed cognitive system illustrating the integration of sensorium, communication and actions.
Figure 9:
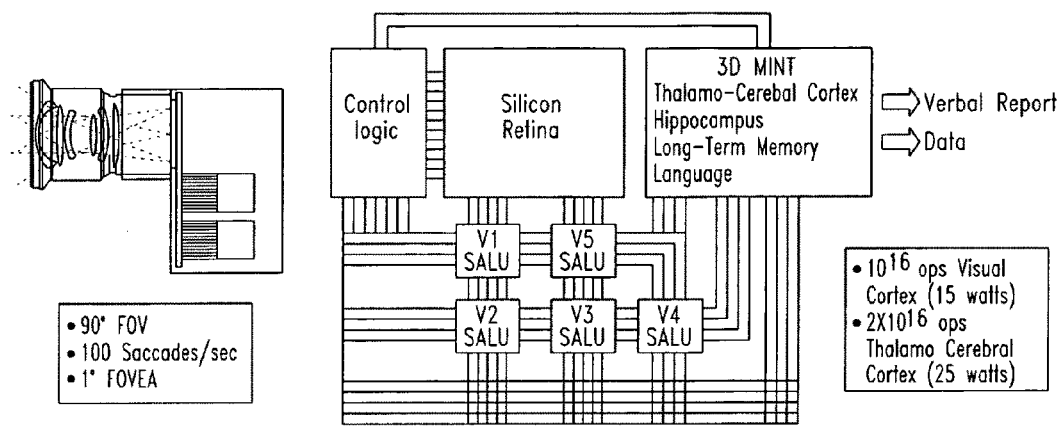
FIG. 9 shows a block diagram of a cognitive system of the invention.

The basic building blocks of a preferred embodiment of the cognitive system of the invention for visual cognition function are shown in FIG. 9. The illustrated cognitive system in this embodiment is comprised of a silicon retina where photons representative of an image or scene are converted into electrons and a preprocessing takes place by adjusting the dynamic range, initial windowing and binning of the image data.

There are several stages in the system's front-end where V1-V5 type functionalities for feature detection (e.g., edge detection, motion detection, color processing, limited template matching) are performed. It is noted that the high level of connectivity (as noted before, fast feed-forward for prefetch and massive feedback for data reduction) is common across the disclosed architecture. The area labeled "3DMINT" provides critical back-end functions such as storage (short and long term memory), associative memory, attention, learning, cognition to language transition, interface to control logic, signal flow and communication processing, command and controllability interface for programming and training.

The "Synaptic Arithmetic Logic Unit" (SALU) is a core low-power analog arithmetic functionality as will be more fully discussed. Another feature is the control logic for providing interface to saccading and foveating functions.

Figure 10:
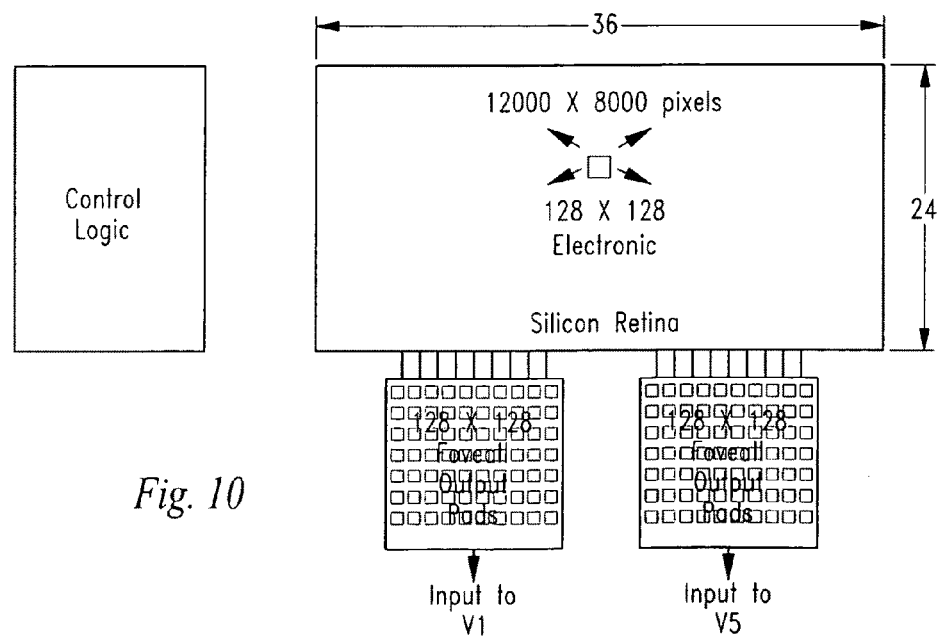
FIG. 10 reflects a block diagram of a human eye-head gimbal system emulated electronically.

The mechanical movement of the eye for saccading functions is replaced by an electronic windowing capability across a large sensor field as shown in FIG. 10. In this embodiment, a sensor field of about 100M pixels is managed by two electronic assemblies made of three-dimensional stacks of microelectronic integrated circuits. In this embodiment, one stack handles the foveated area for cognitive functions. A 128×128 field-of-view is selected from the large 100M pixel area. The other stack scans the remaining field rapidly in 128×128 windows for motion, color or intensity changes.

A beneficial aspect of the invention involves the replication of the high synaptic connectivity in a human brain. Sensory cortices involve hundreds of millions of neurons in specialist columnar architectures that talk to each other to reach a conclusion. The solution is to reproduce that connectivity by use of an inherent feature of the disclosed three-dimensional implementation. In this embodiment, two transverse-mated cubes allow an L×L (L=number of layers in each stack) fan-in/fan-out connectivity such that all virtual neurons in each cube are connected to each other.

Yet another feature of the invention is the illustrated low power synaptic arithmetic logic unit. The implementation of this embodiment of the synaptic arithmetic logic unit is based on the multiply-and-accumulate (MAC) operation.

Figure 11:
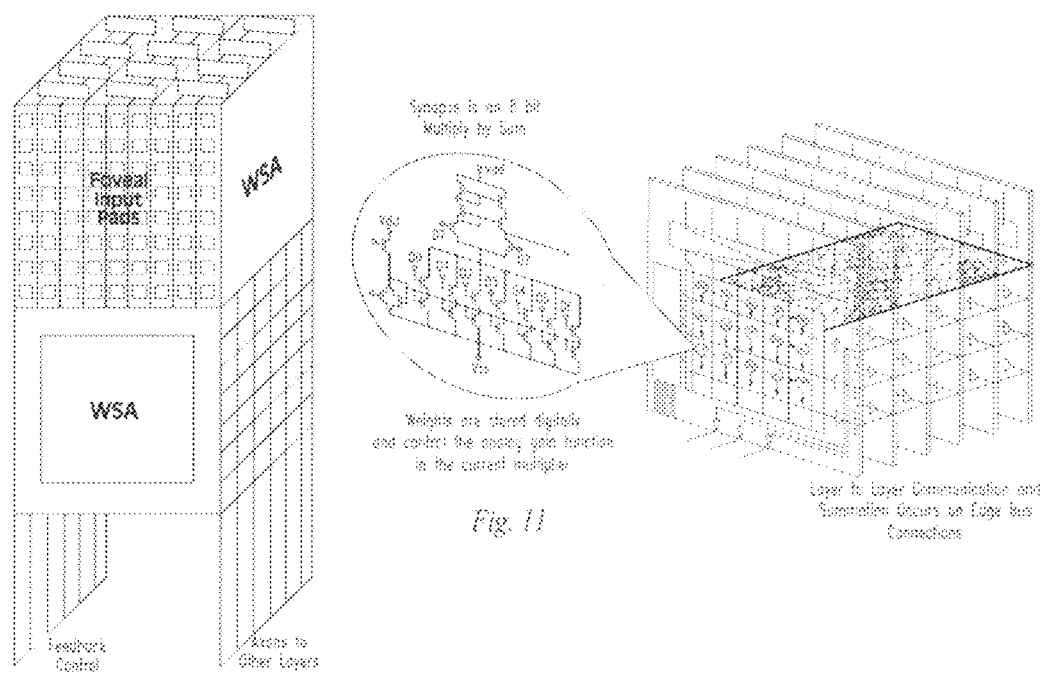
FIG. 11 illustrates a synaptic arithmetic logic unit showing basic elements of a cognitive sensor system using transverse-mated cubes for increased connectivity for virtual neurons.
Figure 12:
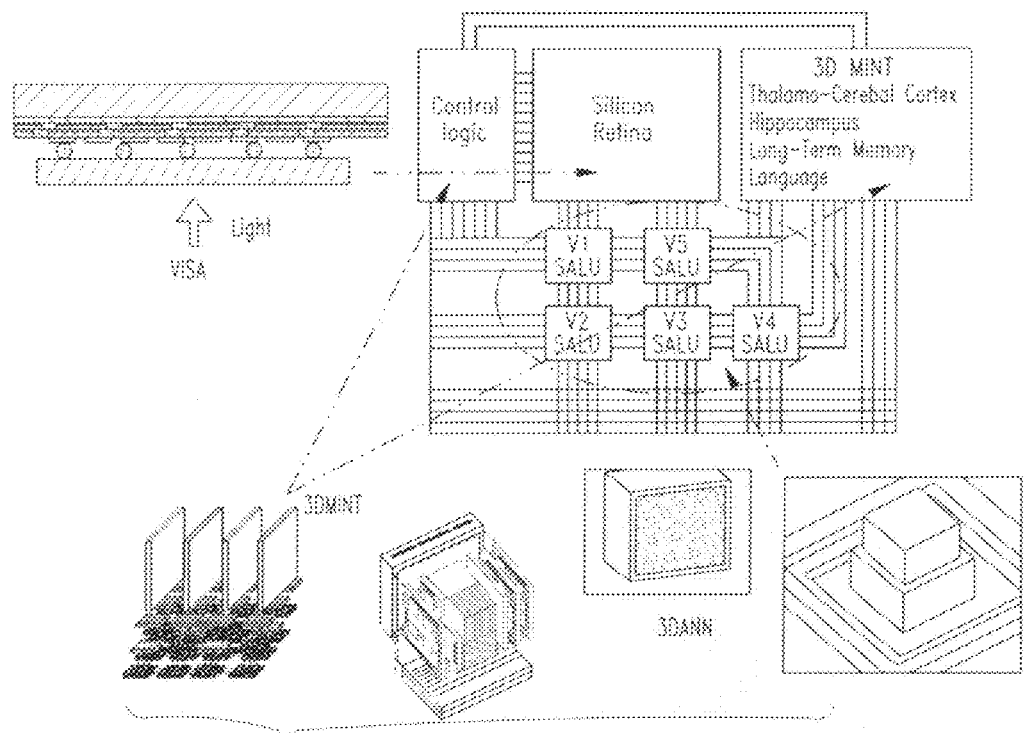
FIG. 12 is a block diagram of a cognitive system.

A weighted multiplication allows selective emphasizing (or deemphasizing) of selected inputs as shown in the preferred embodiment of the synaptic arithmetic logic unit of FIGS. 11 and 12, illustrating the basic building blocks for a cognitive sensors system and transverse-mated cubes for increased connectivity for virtual neurons.

A fully connected N×M analog current mode multiplier array is the basis of the SALU in this embodiment. The analog operation with equivalent resolution of 8-10 bits designed using sub-threshold CMOS operation consumes very low power (in the mW range) and can perform billions of MACs per second. Each node of the array contains SRAM cells for receiving or outputting of 8-10 bit data and weights.

The SRAM cells feed current DACs that are inputs to 4-quadrant Gilbert multipliers that perform signed multiplication. The currents are summed trivially and digitized externally. In this manner, many circuits may be combined using 3D technologies. Transverse-mated stacks provide full connectivity between arrays.

For instance, a 128×128 receptor field operating at 1 GHz and a frame rate of 0.01 sec provides the equivalent of $1.28 \cdot 10^9$ neurons and $2 \times 10^{13}$ synaptic interconnects in the virtual neuron space. Typical resolution of 8 bits and CMOS implementation using 100 nm or better is expected to result in 3W.

The cortical columns each specialize in a feature. The columns in a preferred embodiment may have an average of six layers. A two-cube emulator will instantaneously replicate the functions of many columns depending on the kernel size.

For example, a 128-layer cube can emulate about 20 columns (128/6) and two transverse-mated cubes provide 40 columns operating in parallel. The number increases when time-division multiplexing is taken into consideration to provide a massively parallel match filter operation.

All cortical functions can be achieved by combinations of this basic building block. The proposed SALU also supports self-organized learning and external programmability.

The implementation technologies for dense and heavily connected circuitry emulating thalamo-cortical functions using hybrid (digital-analog) approaches needed for the back-end processing are desirably implemented using three-dimensional electronic circuitry.

Applicable three-dimensional technologies such as those developed by Irvine Sensors Corp., the assignee herein, allow systems composed of many (8-128) active layers, each 50-200 microns thick, formed by stacking and molding chips together and containing low power analog arithmetic units, digital processing units, memory and switching/networking nodes. In-plane wires and through-layer vias form a 3D active, reconfigurable, dense interconnection network. Such stacks can be further combined using transverse and orthogonal mounting for increased modular interconnection functionality.

A reconfigurable interconnect layer provides global interconnections between processing nodes to support different architectures. A first layer cache in its own layer completes the reconfigurable processing stack. A large capacity memory stack mounted orthogonally to the processing stack with wide word width provides large memory bandwidths and fast access.

Figure 13:
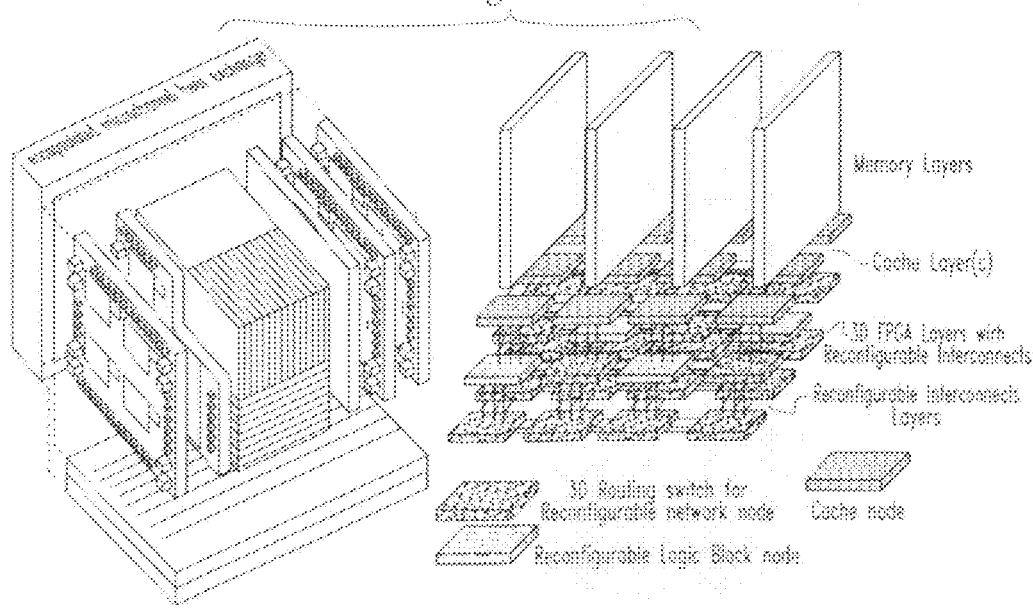
FIG. 13 illustrates major elements of a three-dimensional cognitive system and related architectural structure.
Figure 14:
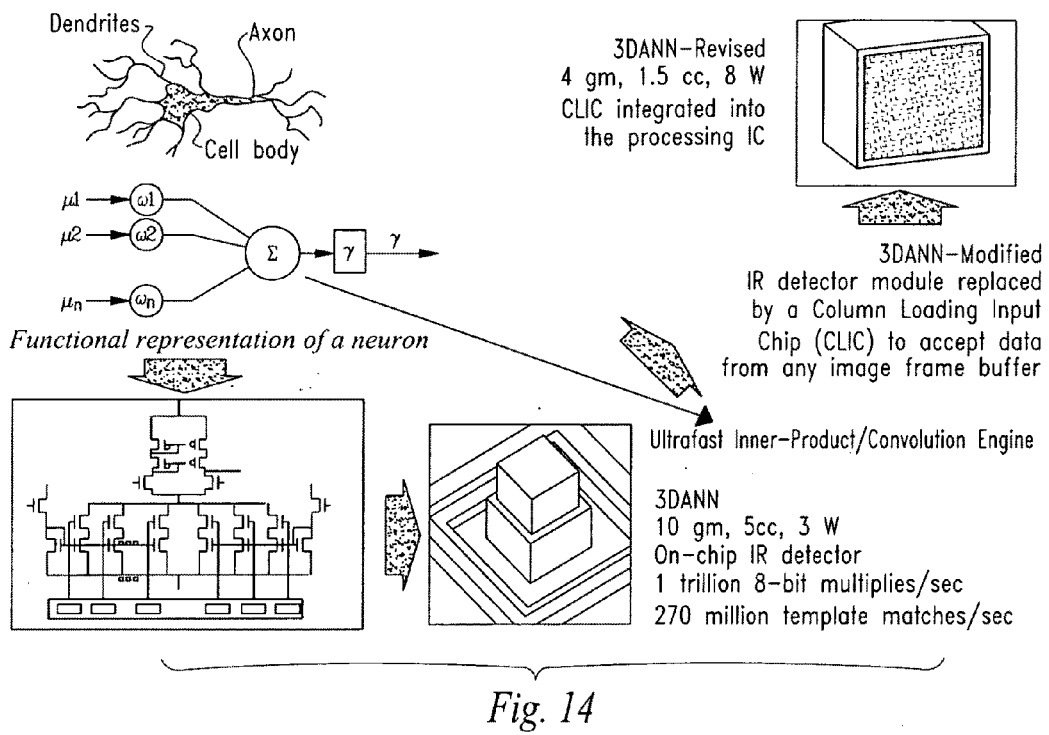
FIG. 14 shows an electronic representation of a neuron and three-dimensional embodiments of same.

A preferred embodiment in FIG. 13 shows a three-dimensional system and its architectural structure. FIG. 14 reflects a three-dimensional artificial neural network and functional representation of an artificial neuron in an electronic embodiment.

Thinned and stacked integrated circuit chips are well suited to emulate the highly integrated neural circuitry of the brain. These circuits may comprise weighted electronic synapse arrays terminating in neurons connected to other arrays. Crossbar switches in each chip enable all possible interconnects within and between stacks and synapses therein.

A bus and control plane analogous to the brain mid-line plane separates the two halves of the stacked circuits and provides clock signals, ground, power, and inter-lobe communications. Input and output is via this plane. Data fields from sensor arrays are passed through stages of high-speed template matching. Those resulting in matches or mismatches are fed back to the weight spaces to improve or degrade the match. Failure to do either results in the creation of new templates. All significant results are stored in long-term memory, here embodied in solid-state, non-volatile flash memory stacks.

A preferred embodiment incorporated into a saccading and foveating sensor supports electronic saccade at 30-100 Hz and foveating in a reconfigurable 64×64 pixel area. Continuous low-resolution imaging is maintained across the entire field-of-view to allow for detection of motion or sudden intensity changes. The supporting hardware controls the saccade by detecting changes and foveating to the area of interest.

The major components in this embodiment are: 1280×1024 CMOS imager (e.g., IBIS5A-1300 from FillFactory/Cypress) and a 3DANN-R hardware device capable of performing over 1 trillion operations/second such as is disclosed in U.S. Pat. No. 6,389,404 entitled "Neural Processing Module With Input Architectures That Make Use of a Weighted Synapse Array" to Carson et al., the entire contents of which are fully incorporated herein by reference.

Figure 15:
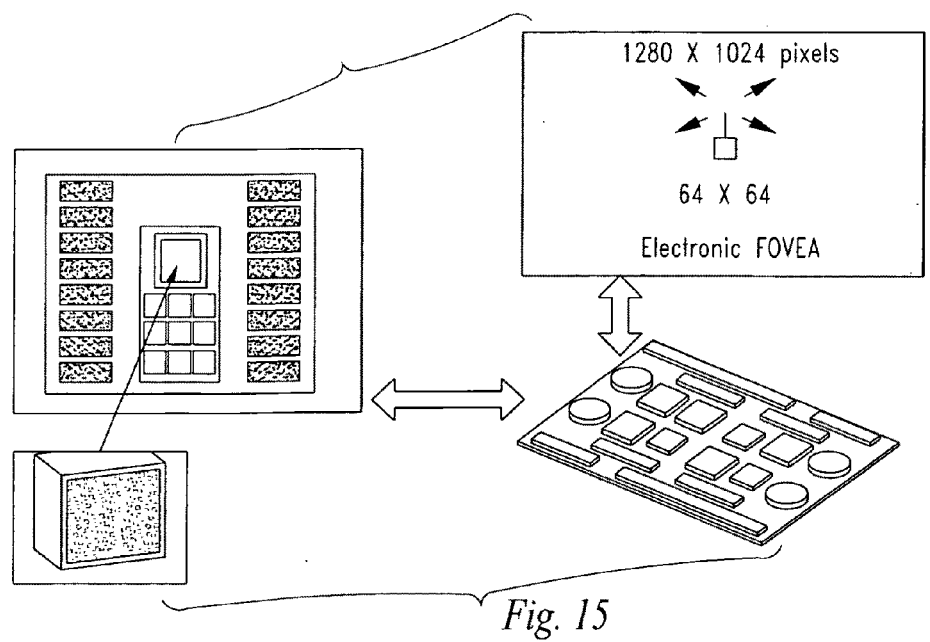
FIG. 15 illustrates an alternative preferred embodiment of a saccading and foveating system of the invention.
Figure 16:
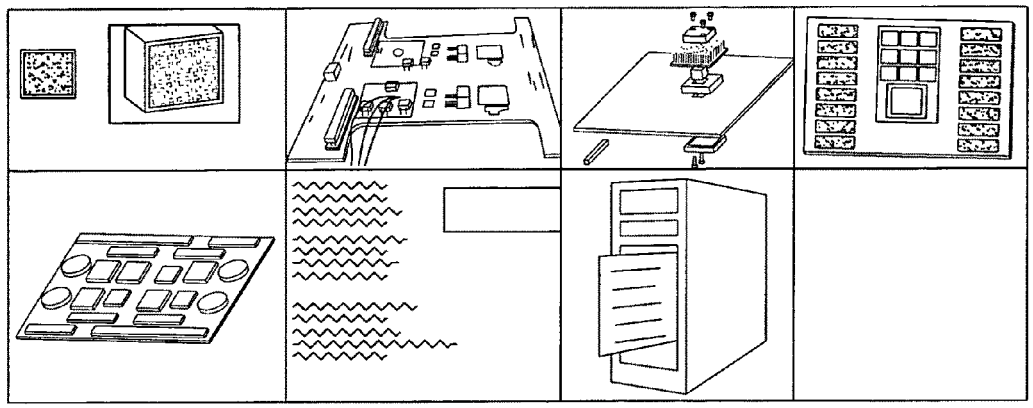
FIG. 16 shows major elements of a support system of a cognitive system of the invention.

Exemplar support hardware may consist of a 3D-analog computational element, an analog host board and a digital interface board containing an FPGA and memory for control and data I/O. The digital interface board provides over 1 giga-byte/s data I/O bandwidth over two 64-bit wide 66 MHz PCI buses. The 3D hardware is mated to a COTS quad-G4 DSP board and runs under VxWorks real-time operating system (RTOS). The hardware is supported by the necessary FPGA firmware for analog processor control, VxWorks drivers, and host API for C-level application development generally depicted in FIGS. 15 and 16.

Figure 17:
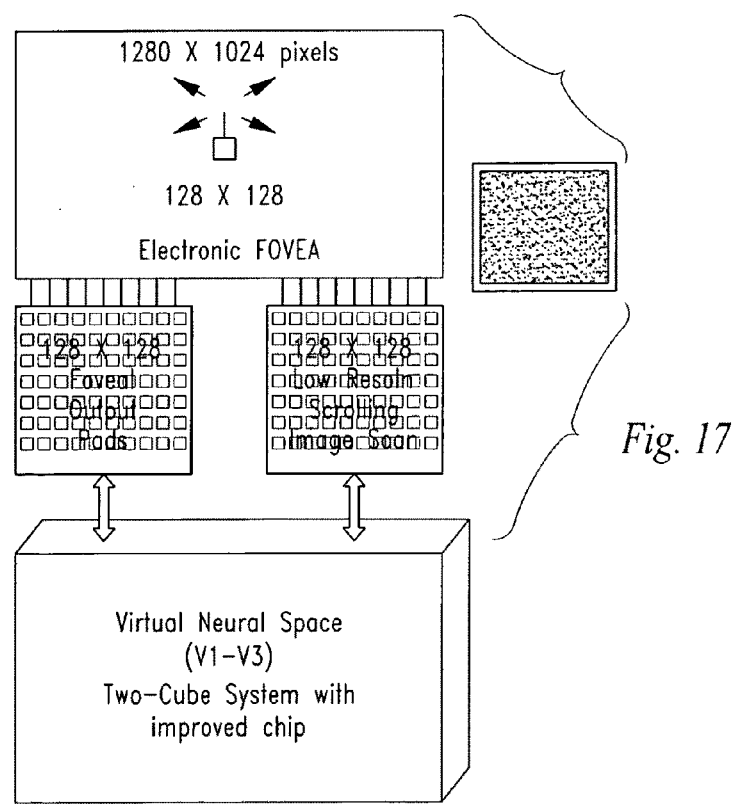
FIG. 17 is a block diagram of an attentive sensor system.

The disclosed attentive sensor system allows for the recognition of selected objects in various backgrounds. The preferred embodiment supports electronic saccade at 100 Hz and foveating in a reconfigurable 128×128 pixel area and is reflected in FIG. 17.

Motion or intensity changes are detected across the entire field-of-view. The fovea is placed in the area of interest and the system tracks a selected object if it is recognized in the foveal area. The evolving images registered in the fovea are stored in the memory. The major components of this embodiment are: $1280 \times 10^{24}$ CMOS imager (e.g., IBIS5A-1300 from FillFactory/Cypress) and a multi-cube virtual neuron system emulating V1-V3 functionality based on a SALU chip.

Biologically inspired computing based on neural networks (NN) required for such tasks of learning, recognition, attention, adaptation, response, and reporting (e.g., visual or natural language) using sensor stimuli (especially visual) require tens of thousands to millions of nodes and a corresponding number of synapse connections.

Further, signal propagation times for learning and adaptation must be in the order of milliseconds. A preferred embodiment of a SALU chip and the corresponding Reconfigurable Attentive Sensor Architecture ("RASA") addresses this need. The described attentive sensor system desirably has the following attributes:

1. High-speed digital I/O interfaces combined with single clock cycle synapse MAC operation ensures very rapid signal propagation through the network (~1 ms per layer) well suited for real-time end applications.
2. The processor has full analog capability with 8-10 bit dynamic range in the input nodes and weights and 10+ bit dynamic range in the outputs (over 60 dB dynamic range) and a fully user-definable nonlinear response function.
3. The RASA is flexible and scalable on account of its FPGA containing high speed (multi-gigabit/s) serial I/O and switch fabric interfaces.
4. A component of the RASA is an SALU ASIC containing, in this embodiment, a 256×256, fully interconnected analog synapse array. The SALU chip is combined with an external FPGA device and memory to form the RASA. The SALU chip contains 256 input layers and 256 output layers that are fully connected and programmable (i.e., 256×256 programmable array multiplier). This embodiment supports 256 input nodes and up to 256 (user selectable) output nodes. The MAC operation that is performed at each cell within the 256×256 array is performed in the analog current mode domain. Accumulation is trivial within a column (join wires together to add currents). Outputs of columns are selectively digitized through programmable current MUX and A/D circuits to allow the user to program the number of input and output nodes and define a synapse or node connectivity matrix.

Figure 18:
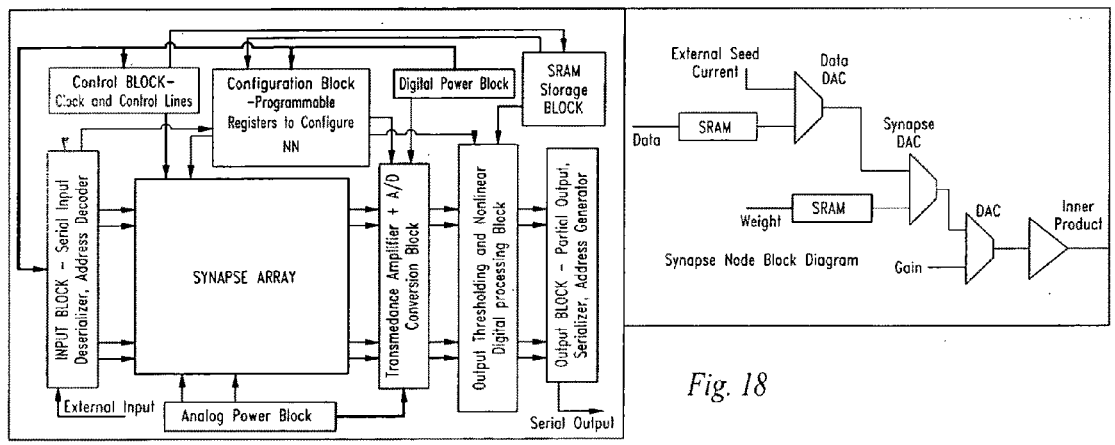
FIG. 18 is a neural ASIC block diagram and related virtual synapse block diagram.

A conceptual functional block diagram of the SALU chip is shown in FIG. 18. The Input Block accepts high-speed serial inputs of data, initialization weights, and control/configuration words. The control lines and address decoder determine the destination of the input streams. Data and weights are loaded into the synapse nodes one column at a time through an input shift register. The Control Block provides control lines and clocks coming to it which are distributed to the various functional blocks within the chip. The Configuration Block holds all the programmable information for the chip such as synapse gain, output threshold function look-up tables, type of output function, etc.

An SRAM Storage Block holds additional lookup tables and output gain normalization coefficients for the nonlinear transformation of the network output.

The Synapse Block contains the 256×256 synapse array that performs the weighted MAC. Data (and weights) enter and exit the chip through high-speed serial interfaces. Control registers are preloaded to indicate whether the input stream is data or weights.

Each synapse node in the array contains SRAM cells for signed 9-bit data and weights and the inputs are loaded in the appropriate locations. The SRAM cells in each synapse feed current mode DACs that are inputs to a 4-quadrant Gilbert multiplier that performs signed multiplication.

Figure 19:
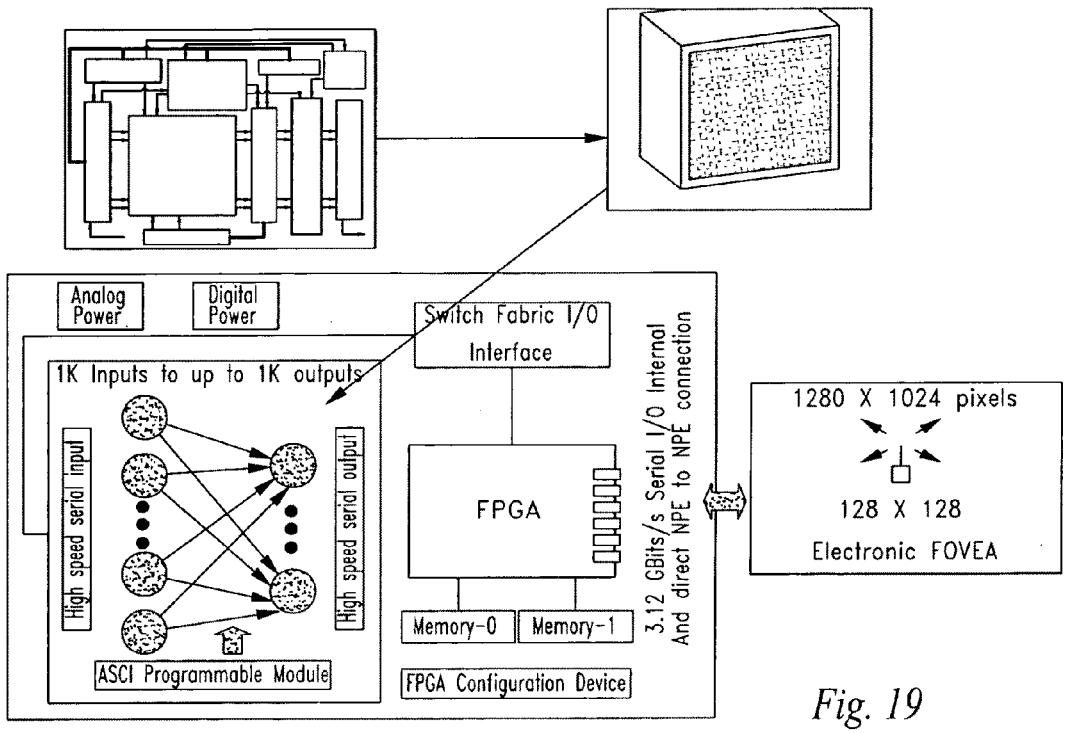
FIG. 19 reflects an alternative preferred embodiment of a reconfigurable attentive sensor architecture of the invention.

The control FPGA on the RASA board provides the control signals and glue logic illustrated in FIG. 19. It also provides the I/O pathways and a programmable connectivity fabric between adjacent boards. High-speed serial I/O lines operating at over 3 GBit/s provide internal I/O between the SALU ASIC and the controlling FPGA. I/O durations within a RASA board (e.g. initializing and updating synapse weights, loading data from memory, etc.) are of the order of 1 ms or less.

Once the data and weights are loaded into the synapse array, the multiply and accumulate operations across the entire array is performed in a single clock cycle. A high-speed switch fabric layer provides connectivity between layers as needed thus providing the necessary flexibility in the architecture (i.e., in determining layer to layer connectivity and feedback). Feedback within a layer is also available through the FPGA. The expected signal propagation time through a single layer is of the order of 1 ms.

Figure 20:
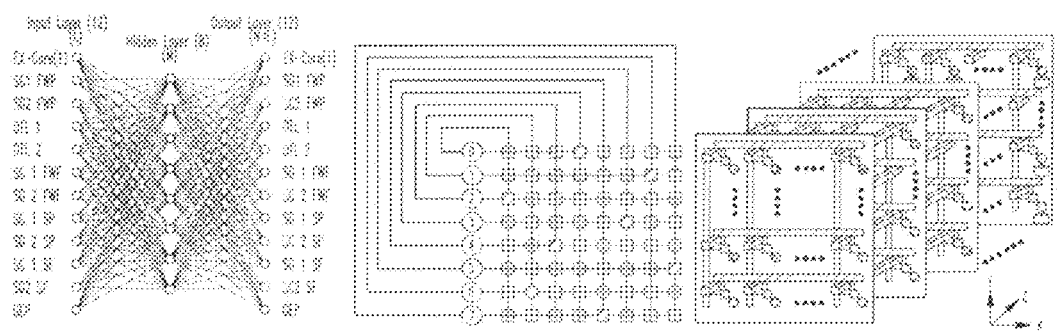
FIG. 20 illustrates the spatio-temporal equivalence of the three-dimensional implementation of a virtual neuron of the invention.

The invention provides neuromorphic hardware implementations needed for a cognitive architecture capable of translating the sensorial input into knowledge and decision exchanged with its environment using a natural language-based communication scheme. The spatio-temporal equivalence of implementing columnar brain structure in, for instance, transverse-mated and connected 3D layered circuits that are time-division multiplexed is disclosed in FIG. 20.

Associative storage in memory starting with the matched filters that exist at each of the sensory inputs and coding schemes for internal and external communication for low-power and higher code efficiency is provided in the disclosed invention as well as at least the following features.

1) Mathematical Representation and models: Mathematical representations of the sensorial inputs in terms of basic system operations and communication modeling based on higher level communication systems such as Internetworking and resonant signal flow.

2) Hardware Architecture Definition: The use of hybrid (analog and digital) reconfigurable systems for massively coupled processor-memory functions, wide word searches in associative memories and short and long range interconnects in the system and efficient search algorithms and communication protocols and coding.

3) Software Architecture Definition: The software architectures integrated with a hybrid (analog-digital) system, configuration descriptions.

4) Controllability and Instructability: The hybrid cognitive system approach in terms of controllability and instructability. Instructability is an inherent feature of verbalized systems. Controllability to allow access and control by a conventional digital system.

5) Simulations: The performance expectations, scalability and stability of the proposed cognitive system by creating computer models and simulating the operation.

A tera-op engine (SALU chip, multi-cube system) integrated with an imager is used to enable recognition of selected objects and saccading/foveating capabilities in an attentive sensor system.

A preferred embodiment of the SALU chip of the invention may be provided with the following features:
 a. Synapse design (256×256 analog current mode multiplier array with 9-bit signed data and weights and 12-bit signed output and nonlinear user definable thresholding function)
 b. Input and output I/O interface Blocks (gigabit serial)
 c. Programmable control (N inputs to P outputs, $P \leq N$) (Control, Memory, and Configuration Blocks)
 d. Transimpedance, A/D converter, and nonlinear transformation Block (256 user selectable channels)

The structure and operation of an alternative preferred embodiment of the invention is set forth below and illustrated in FIG. 21.

Figure 21:
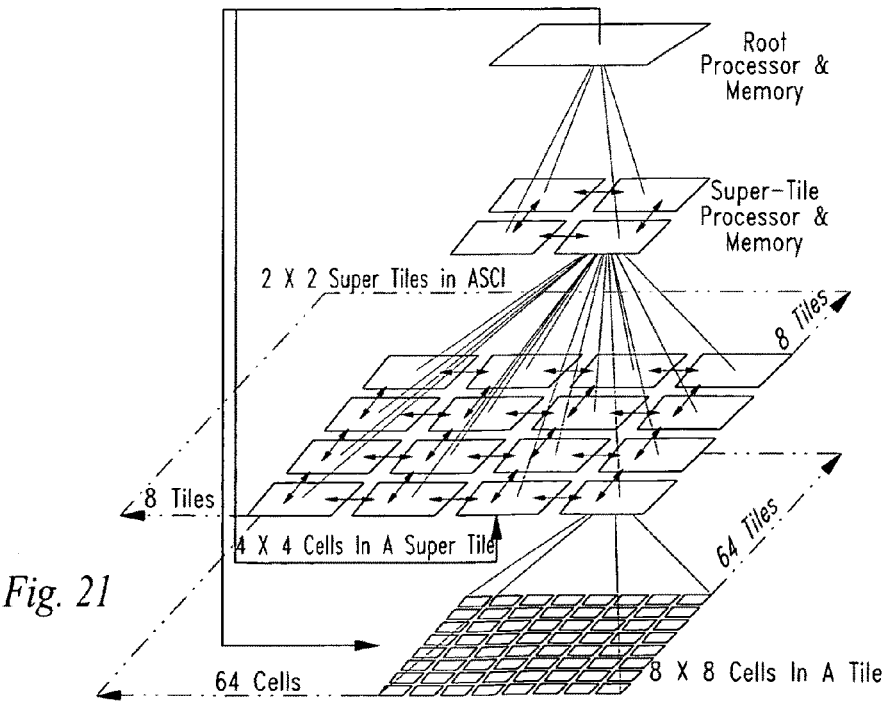
FIG. 21 shows a block diagram of a multi-core neural processing circuit and architecture.

As is seen in FIG. 21, the preferred embodiment has a hierarchical configuration comprised of a root level, a super-tile level, a tile level and a cell level.

The root level preferably comprises a DSP and memory comprising at least one look up table (LUTS), controller means, and buses for data I/O. A separate North-East-West-South, or NEWS, broadcast bus is provided for communications.

One or more supertiles are provided, in this instance each comprising 16 tiles. The embodiment reflects four supertiles (2×2) in an ASIC each with a dedicated supertile processor means such as a DSP and dedicated memory means comprising a lookup table (LUT).

One or more tiles are further provided, in this embodiment 64 tiles are provided in an 8×8 configuration comprising 64 cells each and comprising dedicated processing means such as a DSP and memory means such as SRAM comprising a look up table (LUT).

At the lowest level, a plurality of cells are provided, here 4,096 cells in a 64×64 configuration, each with its own processor and image and weight memory.

The root processor communicates down all hierarchy levels including the cell level.

Supertiles communicate with their NEWS neighboring supertile processors and to the root processor.

The tile processors communicate with their NEWS neighboring tile processors and to the supertile processor's cluster they belong in.

The cells comprise circuitry for running a predetermined convolution kernel mask and communicate with the NEWS neighboring cells and with the tile processor they belong in. The tile processor can address all cell memories in its respective cluster.

An image data set representative of a scene of interest is received from an electronic imager (such as a frame from a video camera) by a memory device (e.g., computer hard drive or electronic memory). In a preferred embodiment, the image data set is a data frame comprising 128×128 pixels. In a preferred embodiment, a VGA image is cropped to a 384×384 pixel frame and binned to the above 128×128 size.

A series of image data subset frames are electronically selected from the image data set and have a preselected size N×M. The selected image data subset frame is sampled from the image data set a predetermined number of times. More simply, a pre-determined N×M pixel "cutout" is "stepped" across the image data set to create a predetermined number of image data subsets. The subsets may contain certain overlapping identical image data.

For instance, an image data subset frame size of 32×32 pixels may be sampled from a 128×128 image data set a series of 49 times and generate 49 image data subsets from the single image data set.

One or more filters or 2D convolution kernel masks are provided in suitable convolution processing circuitry in one or more cells which kernel masks may comprise one or more spatial (Gabor), temporal/motion (Riechardt), color, orientation or surprise convolution kernel masks. A preferred embodiment comprises a 16×16 pixel 2D convolution kernel mask.

The basic element of the invention is referred to herein as a "cell". A cell may be comprised of a processor having dedicated image/weight memory for the one or more convolution kernel mask processes wherein a plurality of cells are provided for the parallel convolution and processing of the data image subsets.

The instances where the pixel values in the image data subset are multiplied and accumulated (i.e., convolved) against a predetermined set of pixel weights in the convolution kernel mask (i.e., the filter values) result in higher convolution output values representative of those pixel locations.

An image data subset is received by a cell and convolved with the one or more 2D convolution kernel masks in a sequential set of multiply and accumulate (MAC) operations whereby selected pixel values in the data image subset are sequentially multiplied and accumulated in a set of MAC operations across the pixels, generating a series of convolved output data sets from the series of image data subsets.

The various convolution output values of the convolution operations generate one or more sets of higher valued data or "peaks" at certain of the pixel locations depending on the function/weighting of the convolution kernel mask. The peaks are representative of a "match" of the image data subset with the criteria set forth in the respective convolution kernel mask. Similarly, non-relevant convolved image data will generate low data value outputs.

One or more predetermined thresholds may desirably be implemented to remove non-relevant or low importance image elements from the convolved outputs.

Peaks in the outputs from the various convolution operations suggest salient features in the scene which are "foveated" as areas of interest for subsequent processing, template matching and higher resolution analysis.

Structurally, the method above may be implemented in suitable circuitry, such as in an application specific integrated circuit or ASIC, as follows.

A plurality of the above cells comprise a "tile" having a dedicated tile processor such as a digital signal processor DSP and dedicated SRAM memory comprising a dedicated tile look up table (LUT).

Further, a plurality of tiles comprise a "supertile" having a dedicated supertile processor such as a DSP and dedicated SRAM memory comprising a dedicated supertile look up table (LUT).

The LUTs may be used in certain processing algorithms. The LUTs may be part of a set of processing components in the system pipeline. The LUTs may be configured to perform almost any function that can be differentiated including use as a Sigmoid function. The Sigmoid function may be implemented to reduce the total dynamic range of a set of data (data reduction) and may be implemented in neural networks. The Sigmoid confines the output to between +1 and −1 with an "S" shape transfer function. The LUT may also be used to perform a square root function.

The local cell memory may desirably be the M1 or M0 or cache. The cache feeds the M1 and M0. The weights for spatial features are preferably located in the M1. The image data is put into M0.

For motion detection, the M1 is filled with a version of the image so that motion from one frame can be determined with respect to another frame. The cache is a temporary storage location from which the M1 and M0 are pulled.

Yet further, a "root level processor" comprises a root processor such as a DSP and dedicated root processor memory, a controller and data bus structures for communication with all hierarchy levels in the device, i.e., the supertiles, tiles and cells.

A simplified block diagram of the data flow of the cognitive processing device is shown in FIG. 22.

A camera supplies a video file to a hard disk storage location. The frames are recovered from the file and arranged in blocks (32×32 pixels×16 frames). The blocks are processed in a two-dimensional convolution against a set of spatial filters that allow emphasizing features in the data output. The output is fed into a one-dimensional convolution that adds contrast to temporal variations. The data is then thresholded using the mean plus standard deviation of the temporally filtered data as the threshold value. Data below the threshold is set to zero. Data above the threshold is set to the value minus the threshold value. In some applications, the data is further reduced by applying a Sigmoid function to limit the dynamic range. This constitutes the simple cell output.

The 2D convolution at the cell level is the processing element that generally limits the entire processing chain throughput. The on-chip look up table (LUT) multipliers are not required for this function; instead combinatorial logic may used. This permits four 16×16 block-windows to be convolved in parallel.

The complex cell processing consists of another 1D convolution that examines the data for spatial features that occupy more than one block. The data from the blocks are squared and summed together prior to running a 1D convolution against spatial filters. The data may be thresholded if desired as before with the threshold being set as the sum of the mean and standard deviation of the data derived from the 1D convolution. The data below the threshold is set to zero. Finally the data may be reduced once more if desired with a Sigmoid function prior to reporting out the complex cell information.

As the data moves down the pipeline, the extraneous information in the data is being removed and the processing becomes simpler.

The number of multiplies and adds in the processing chain in this preferred embodiment can be computed as follows:

1) Each image block-window in the 2D convolution contains a 16×16 pixel image convolved against a 16×16 pixel filter mask.

2) Each image block-window is single pixel stepped 8×8 positions to cover a 32×32 pixel block.

3) Each block-window is convolved against 16 filter masks.

4) Each block-window is convolved against 16 frames.

5) Each block is half stepped 7×7 positions to cover a 128×128 image avoiding the edges.

6) Each image is processed at 30 Hz.

Thus, the preferred embodiment is performing (16×16 kernels)×(8×8 positions)×16 frames×16 filters×(7×7 steps)×30 frames/sec=6.16×10$^9$ multiply and adds per second in the 2D convolution array.

The above-preferred embodiment processes an image of 128×128 by reducing the resolution of the original image to this size while preserving the original resolution in a buffer on the host computer.

The salient features identified by the system can be examined in full resolution from the buffered data by a target recognition algorithm. The system passes the pixels' position and frame number to the host computer.

Host computer processing begins with the host computer. The host takes in video frames from a camera through a fire wire port or takes digital video files. In this preferred embodiment, the input frames are cropped to 384×384 pixels and then binned to 128×128 frames. The data is then passed to a 4DSP interface board in the host computer to feed the data into the motherboard across a 32-bit bus. The 4DSP path is bi-directional so that completed processing can be fed back into the host computer.

The data is converted to 64-bit wide inside the motherboard FPGA and stored in the motherboard's DDR2 memory. The image data is extracted from the DDR2 memory in blocks of 32×32 pixels by 16 frames and passed to the daughterboard along a 32-bit wide FIFO interface.

This data is then cached in the daughterboard's FPGA's SRAM. The image is called from the cache in 16×16 pixels by 16 frame block-windows which are stored in the FPGA in the M0 memory. There are two other local memories that are filled by the same path but only once per processing run. The M1 memory is used to store the spatial filter (16×16 elements) that is used for the 2D spatial convolution. The M1 memory can hold 16 such spatial filters. The M1 memory can also hold data (imagery) taken from the M0 memory to be used in temporal filtering when running a temporal saliency algorithm. The third local memory location is for the small temporal coefficient memory, a 16×1 array that allows for temporal contrast enhancement.

The 2D convolution occurs in the daughterboard in the illustrated embodiment. The convolution takes place between the data stored M1 and M0 local memory and may use combinatorial logic instead of DSP slice multipliers.

Mathematically what occurs is:
For SN=0, 1 . . . 63
i=2*floor(SN/8);
j=2*mod(SN/8);
FN is the filter number 0 to 15
SN is the position number of the 16×16 image within the 32×32 pixel block
fr is the frame number 0 to 15
x and y are the pixel number 0 to 15

$$\text{cell}\{SN(i,j), FN, fr\} = \sum_{y=0}^{15} \sum_{x=0}^{15} (m0\{x+i, y+j; fr\} \cdot m1\{x, y; FN\})$$

Figure 23:
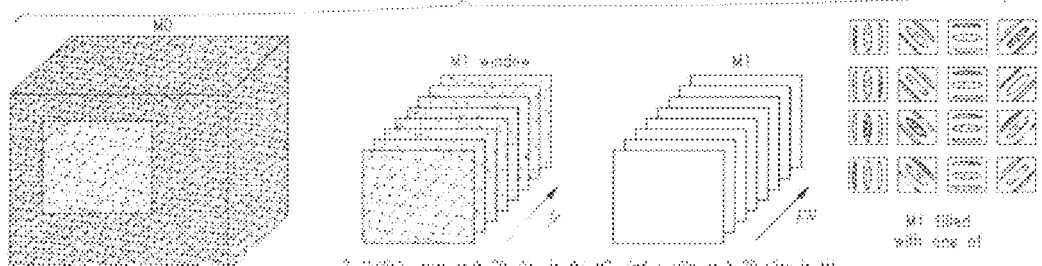
FIG. 23 shows a graphical representation of data blocks in a 2D convolution.

Graphically what occurs is shown in FIG. 23.

M0 cache contains 16 frames of a 32×32 pixel image, called a block. The M1 window selects a 16×16 pixel image by 16 frames from this cache, called a block-window. The first frame of the 16×16 image block-window is convolved with the 16 spatial filters in M1. Next the second frame of the 16×16 image block-window is convolved with all 16 spatial filters in M1. This is repeated until M0 is multiplied and summed with M1 65,536 times (16 pixels×16 pixels×16 frames×16 filters). Next the M0 window is indexed over one pixel. This is noted by the SN number and indexed by the i and j variable. When this set of convolutions is completed, the M0 block is updated with a new block that is stepped by half a block=16 pixels.

The process is repeated 7×7 times to complete the 128×128 image. The process begins again using the next group of 16 frames in a block. The process uses the current frame plus the previous 15 frames. The process is weighted to the most current frame by the temporal multiply and accumulate (MAC) engine.

The temporal MAC convolution is computed by:

$$MAC_{tile}\{SN, FN\} = \sum_{fr=0}^{15} \text{cell}\{SN, FN, fr\} \cdot tcoef(fr)$$

Where tcoef (fr) is a zero mean one-dimensional weighting filter similar to that illustrated in FIG. 24, i.e., temporal filter 16×1, zero mean and weight toward initial frames.

Whereas the initial 2D convolution removed the pixel position dimensionality from the data, the temporal filter removes the frame dimensionality from the data. One is left with MAC{SN, FN}.

The next step in the pipeline reduces the data further by applying a dynamic threshold. Data below the threshold is set to zero and above the threshold is set to a value equal to the data value minus the threshold.

The threshold value is computed using the data in the MAC{SN, FN} array. The threshold value is the mean plus the square root of the variance of each pixel in the MAC array over time with a forgetting function applied. This is illustrated in FIG. 25.

Each block of image data at this time is convolved with 16 frames, i.e., 0 to 15. Then the next frame is added and the block of data consists of convolved frames 1 to 16. This is illustrated as time steps in FIG. 25. The threshold is computed for each pixel in the block across 16 times steps. The mean and square root of the variance are computed. A forgetting function is also applied to the threshold to more heavily weight the newer frames.

To build the threshold one computes the mean times the forgetting function as:

$$x(P,SN,FN)=x(P,SN,FN)+MAC(P,SN,FN)*f(t)$$

Then x (P,SN,FN)/16

Where x (P, SN, N) is the sum value of the MAC at each P (position of the block in the 128×128 array), SN (position within the 32×32 pixel M0 cache) and FN (filter number). MAC (P, SN, FN) is the current temporal Multiply and Accumulate total value f(t) is the forgetting function=FF$^{(15-t)}$
t is the temporal step
and FF is 1023/1024
The mean is squared similarly:

$$x^2(P,SN,FN)=x^2(P,SN,FN)+MAC(P,SN,FN)*MAC(P,SN,FN)*f(t)$$

Then $x^2(P,SN,FN)=x^2(P,SN,FN)/16$

If t=15 then

Mean=mean(P,SN,FN)*x(P,SN,FN)*FF/(1+FF)

Var=var(P,SN,FN*$x^2$(P,SN,FN)*FF/(1+FF)

Finally the square root of the Var is computed and added to the mean for the threshold.

An FPGA provides DSP slices for multipliers in the temporal convolution, but can also use look up tables (LUTs) for many pipeline functions. The threshold block is followed by a custom look up table (LUT). The LUT can be used to compute any function that can be expressed as a Taylor series expansion (differentiable equation).

For example, the LUT could be used to compute the square root of a number or the LUT could be used to transform (reduce dynamic range) the data using a Sigmoid gain curve. The square root function used may be implemented in the threshold calculation using a simple binary estimation.

The Taylor Series Expansion for a function F(x) takes the form:

$$F(x)=f(a)+f'(a)*(x-a)+f''(a)*(x-a)^2$$

For example, if one wanted to compute the Square root of x, one could rewrite the Taylor Series Expansion as:

$$F(x)=a0.5+\tfrac{1}{2}a^{-0.5}*(x-a)+\tfrac{1}{8}a^{-1.5}*(x-a)^2$$

x is the unknown and a, f'(a), (a), and f''(a) are values from the look up table.

The LUT may be computed and loaded upon the program initiation. The LUT may look like FIG. 26 with the hundreds of values for a, f(a), f'(a) and f''(a). Accuracy results are shows for a 32-bit LUT implementation of a square root in FIG. 27

If one wishes to take the square root of the output of the threshold function (thr_out), the system would search the LUT for the value of "a" such that (thr_out-a) was a minimum. Then the values for (x−a), f(a), f'(a) and f''(a) could be read from the table and used to compute the Taylor Series Expansion estimation for the square root of thr_out.

Then, f'(a) and f''(a) can be less than one so left shift of the data is necessary and must be accounted for.

The LUT table consists of 1024×3 coefficients. Where f(a) is a 16-bit word and f'(a) and f''(a) are 32 bit words.

The output of the LUT in the daughterboard is fed back into the motherboard through a separate 32-bit wide FIFO. The data may either be extracted at this point to become the simple cell output for the TDA analysis or it can be fed into the supertile MAC for complex cell processing.

The initial complex cell processing simply involves summing adjacent simple outputs. The data is read out as the complex cell output. One may instantiate further processing to include a 1D convolution of a filter that contains an 8×1 filter as shown below:

$$MAC_{super-tile}\{SN, C\} = \sum_{x=0}^{1} \text{cell}\{SN, FN(2C+x)\} \cdot fcoef(C)$$

The WCS (Writeable Control Store) Unit is the programmable hardware module that implements the core processing functions, i.e. image load from Supertile Input cache RAM to cell array memory, image convolution/correlation computation of a cell array. In this embodiment, the WCS is attached to a MIPS processor as an extension module. The main features of WCS is its micro-program architecture which implements macro-instructions issued from MIPS processor by executing micro-instructions stored in WCS RAM. The micro-instruction is broadcast to the tile cell array and other processing functions and controls the access to various memories and registers. A customized "mic/mta" micro-programmer software is used to generate the controller for programmable hardware.

To support the cognitive system, a camera may be interfaced to the host computer and the 640×480 pixel video stream processed for forwarding to the motherboard. Inline cropping and binning functions may be applied to reduce the data to a size and format compatible user-selected criteria.

The cropping function copies a 384×384 image about the center of the captured video image, discarding the pixels outside of the crop area. The binning function further reduces the images size by averaging 3×3 pixels, and outputting one pixel to the resultant image.

This 128×128 image stream is blocked. The resulting data is transferred to the cognitive system motherboard for processing on the daughterboard.

The image stream transfer utilizes shared memory such that the software used for previous development efforts was largely unmodified, reducing effort. Processed data is stored in files.

The block diagram for the video input is shown in FIG. 28.

Figure 29B:
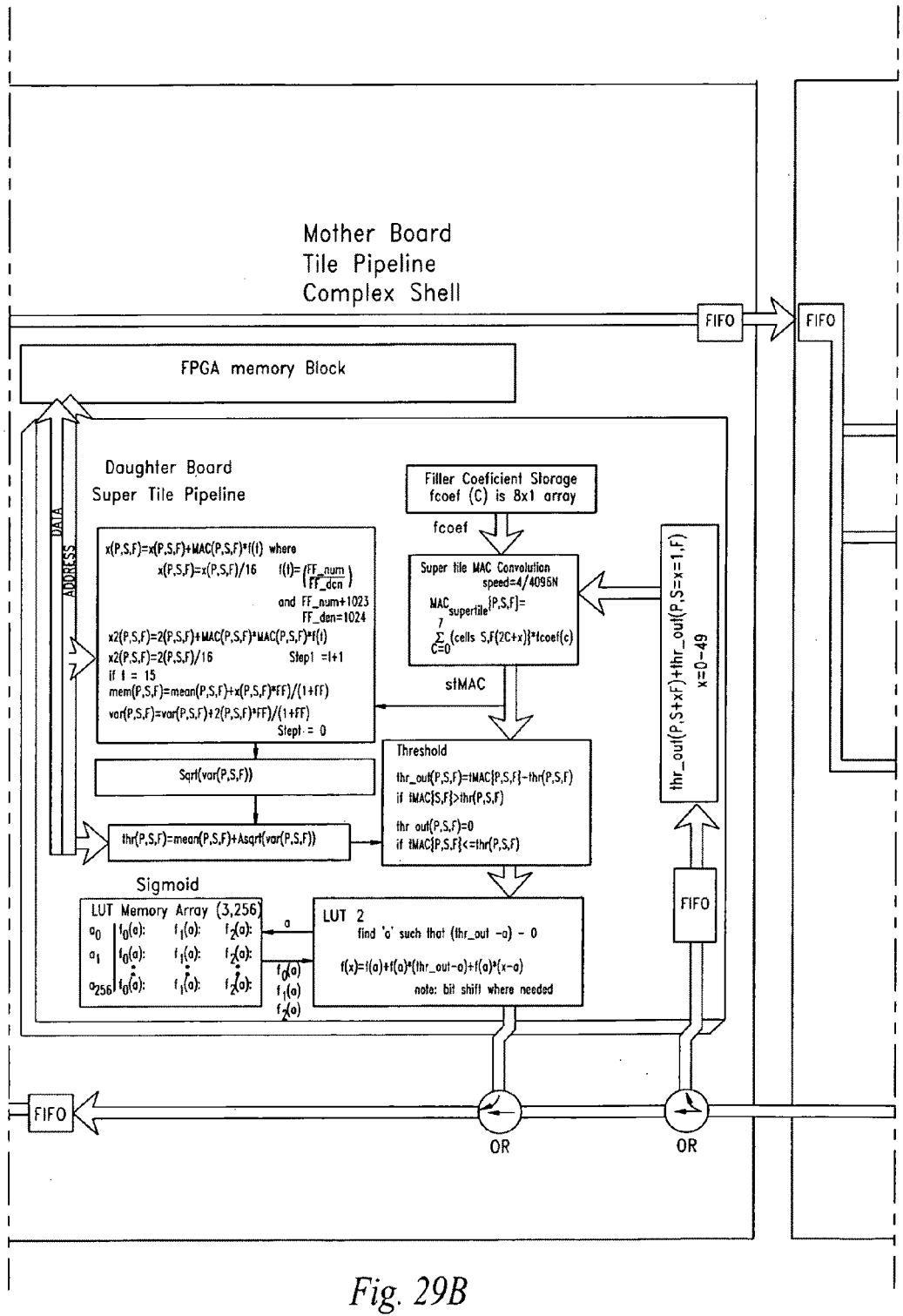
FIG. 29 is a hardware and firmware block diagram of a preferred embodiment of the invention.
Figure 29C:
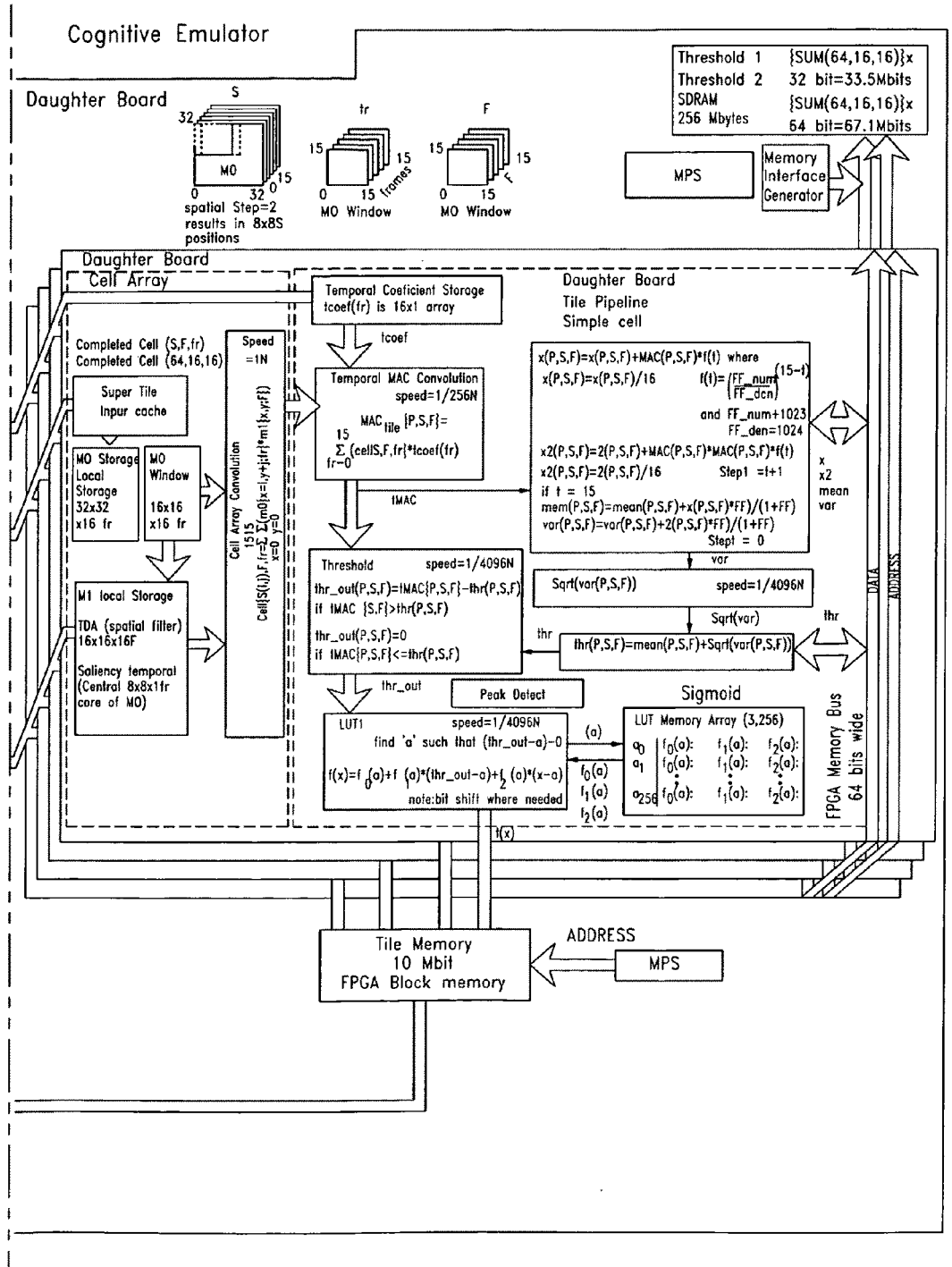
Figure 30:
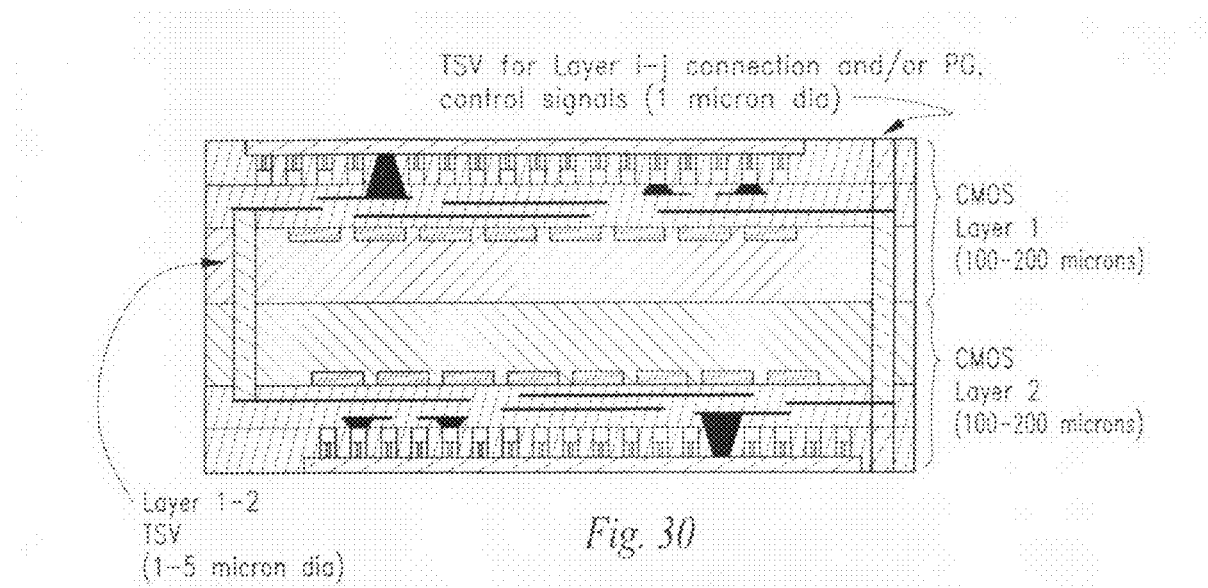
FIG. 30 is a 3D stacked pair of neuronal unit cells.
Figure 31:
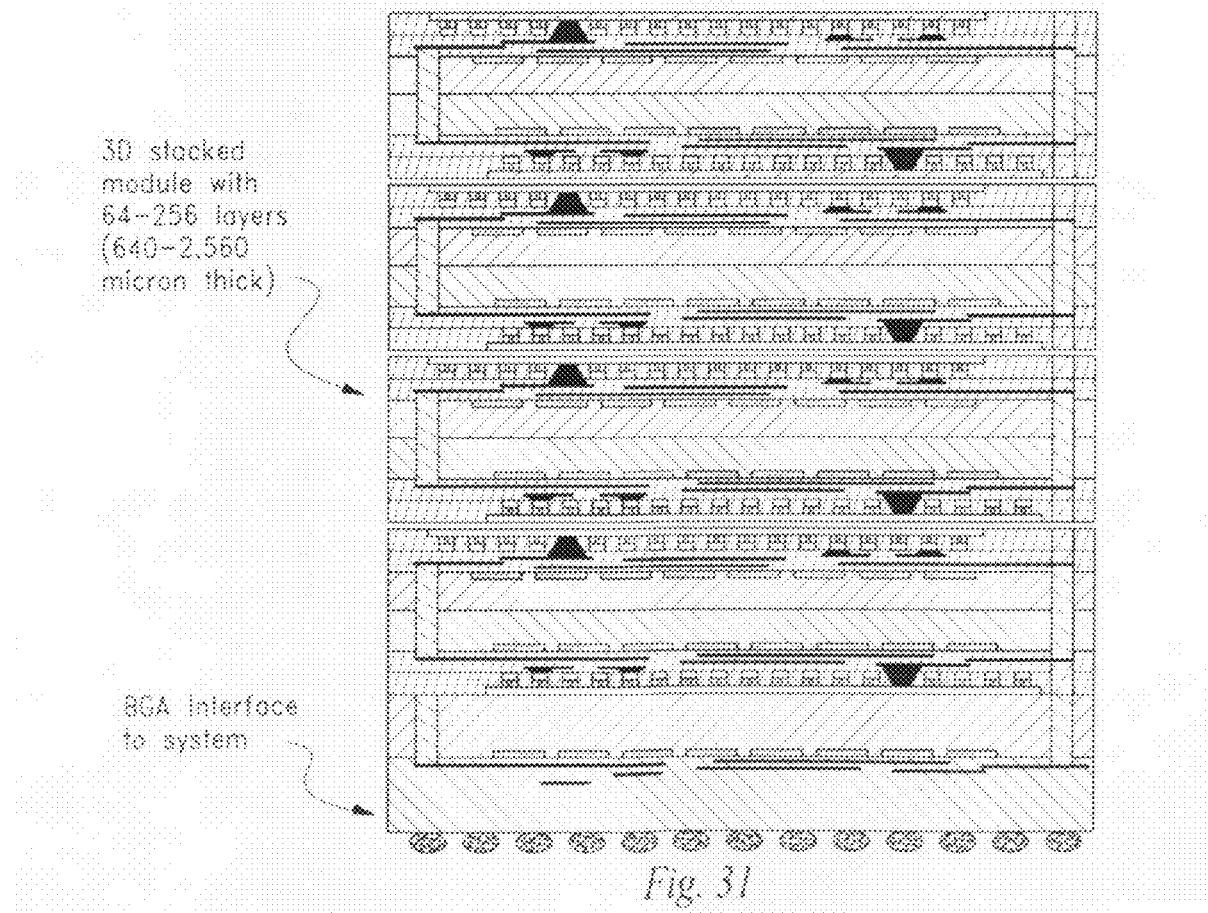
FIG. 31 is a stacked neural module housing $10^6$ neurons and $1.6 \cdot 10^{10}$ synaptic junctions in one $cm^2$ footprint.

A yet further alternative preferred embodiment allows a balance in the space-time trade-off and speed-power trade-off is illustrated in FIGS. 29, 30 and 31.

FIG. 30 illustrates a 3D stacked pair of neuronal unit cells. The embodiment exploits semiconductor packaging and high density interconnect fabrication technologies to enable a neuromorphic computing module that emulates closely the spatial and temporal structure of the brain by incorporating $10^{10}$ synapses and $10^6$ neurons in a footprint of about 1 cm$^2$ as shown in FIG. 29.

This embodiment may comprise for instance:

1. An ultra-low power floating gate CMOS-based compact synaptic cells with a relatively low parasitic capacitance including neuron and learning circuits implemented in CMOS technology, integrated with synapses operating at about a 10 kHz clock range.

2. A 3-D stacking approach to achieve the high density of $10^{10}$ synapses and $10^6$ neurons by combining multiple tiers of circuitry with dense vertical interconnects to enable high fan-in, fan-out connectivity.

This architectural approach is driven by the columnar structure of the human brain with both fast and slow feedback and feed forward paths. Each column comprises about 6-layers and can be specialized in selected functions or dedicated template matching tasks. The columnar organization allows the input data to be distributed in a space invariant scheme both vertically (realignment and data to information process) and horizontally (multiple match filters for data elimination) for efficient recognition. This columnar structure allows for a very efficient hierarchical processing.

Neurons provide more complex functions than a simple summing junction (soma) to support various computing and learning modes including: multi-order multiplication, amplification, sharpening, thresholding, saturation, temporal filtering, spatial filtering, coincidence detection, local memory (more than few bits), auto-association, localized long-term plasticity, localized simple but adaptable instructions and capability to maintain the state of the connectivity/communications. Each neuron is connected to about 1,000-10,000 other neurons using dedicated excitatory and inhibitory synaptic junctions.

In addition, more interconnectivity supports long distance routing (x, y, z directions), control signals and other housekeeping tasks.

The spatial density potentially lost by using low power design techniques is recovered using the disclosed 3D integration. In addition to providing spatial densities, the neural (synaptic) connectivity required is also very conveniently supported by 3D integration. The disclosed embodiment uses a back-to-back stacking of thinned bulk CMOS chips to form a pair as illustrated in FIGS. 30 and 31.

The advantages of this embodiment are at least:
1. The connectivity is doubled,
2. Signal routing is greatly simplified (E-W and N-S can be resolved both on the top and bottom),
3. The functional area for each neuron is doubled, more silicon,
4. Back-to-back connections allow ease of alignment performed at TSV level (microns),
5. Total thickness is about 100-200 µm for ease of handling,
6. Better yield by forming pairs (or doublets) independently,
7. The columnar structure of the brain can be easily replicated.

In the illustrated cross-section, through silicon vias (TSVs) with diameters of about 1-10 µm and on a pitch of about 10-30 µm are used to connect one tier to the other. Some TSVs are used to form, Z-direction connections, including busses to increase the connectivity beyond a single pair. Using current 3D stacking technologies, TSVs can be made with diameter-to-height aspect ratios of 1:20.

FIG. 31 shows a stacked neural module housing $10^6$ neurons and $1,6.10^{10}$ synaptic junctions in a one $cm^2$ footprint. Using high density three-dimensional microelectronic packaging technologies, by combining the "pairs" together, the total number of stacked layers is further increased to achieve higher densities as seen in FIG. 30. The total thickness of the stacked module is in the range of 1,000 µm, comparable to a conventional silicon chip. The total synaptic connectivity of an 8-high stacked neuron unit cell is between 1,000 and 2,000 synapses/neuron. Assuming that each neuronal unit cell is 10×10 µm, each stacked module of 1 cm×1 cm×0.2 cm (or 1 $cm^2$ footprint) accommodates about $10^5$ neurons and about $1.6 \times 10^9$ synaptic junctions in a structure comparable to a chip with ball grid array interface for subsequent system-level packaging.

Figure 32:
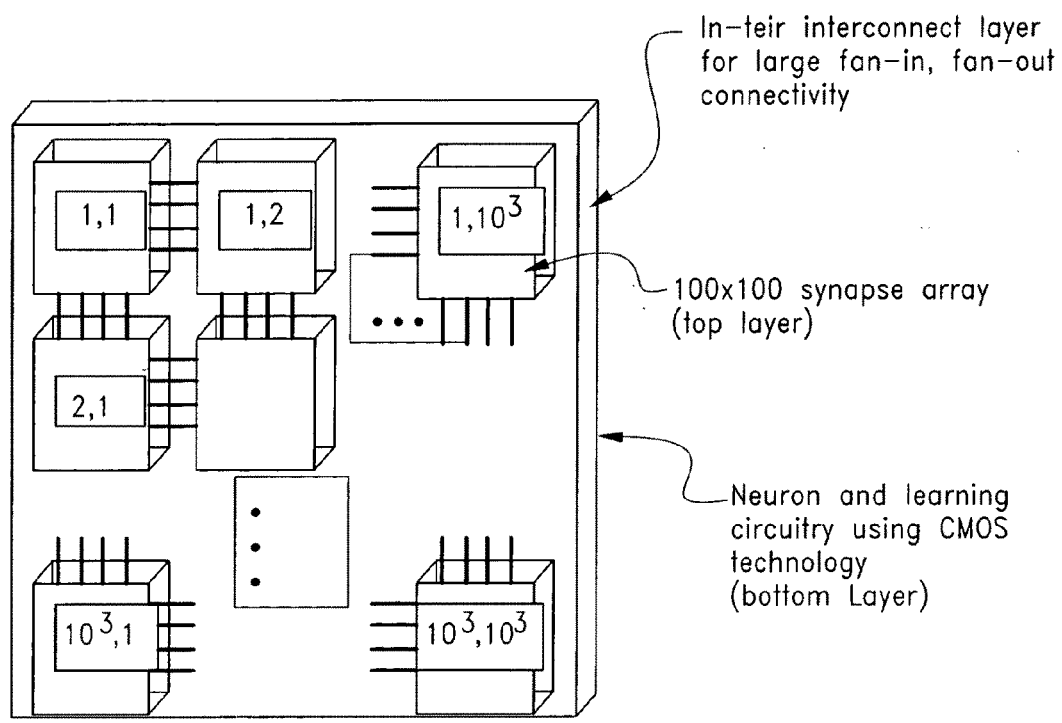
FIG. 32 is a one $cm^2$ building block comprising $10^5 \times 10^5$ synaptic arrays overlaid on individual $10^3 \times 10^3$ neuron arrays in a CMOS layer.

As is seen in FIG. 32, a one $cm^2$ building block of $10^{5 \times} 10^5$ synaptic arrays overlaid on the individual $10^{3 \times} 10^3$ neuron arrays (CMOS layer) is provided. An in-tier interconnect layer is provided for high-density large fan-in, fan out connectivity.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

We claim:

1. A cognitive sensor circuit for the emulation of the visual cortex of a human brain comprising:
   a first supertile and a second supertile,
   said first and second supertiles comprising a plurality of tiles and comprising a supertile processor, supertile memory and a supertile look up table,
   said first supertile in electronic communication with said second supertile,
   said tiles comprising a plurality of cells and comprising a tile processor, tile memory and a tile look up table,
   selected ones of said tiles having a plurality of tile mesh outputs in electronic communication with an E, W, N and S neighboring tile of each of the selected tiles and with a supertile processor,
   said cells comprising dedicated image memory and dedicated weight memory and convolution circuit means for performing a convolution kernel mask operation on an image data set representative of a scene,
   selected ones of said cells having a plurality of cell mesh outputs in electronic communication with an E, W, N and S neighboring cell of the selected cells and a tile processor,
   root processor circuit means for managing electronic communication between said cell mesh outputs, said tile mesh outputs or said supertile mesh outputs.

2. A method for emulating the visual cortex of a human brain comprising:
   providing
   a first supertile and a second supertile,
   said first and second supertiles comprising a plurality of tiles and comprising a supertile processor, supertile memory and a supertile look up table,
   said first supertile in electronic communication with said second supertile,
   said tiles comprising a plurality of cells and comprising a tile processor, tile memory and a tile look up table,
   selected ones of said tiles having a plurality of tile mesh outputs in electronic communication with an E, W, N and S neighboring tile of each of the selected tiles and with a supertile processor, said cells comprising dedicated image memory and dedicated weight memory and convolution circuit means for performing a convolution kernel mask operation on an image data set representative of a scene, selected ones of said cells having a plurality of cell mesh outputs in electronic communication with an E, W, N and S neighboring cell of the selected cells and a tile processor, providing an image data set representative of a scene, selecting one or more predetermined image data subsets from said image data set, receiving said one or more image data subsets to a cell, and, performing a concurrent convolution kernel mask operation in said cell on said image data subsets to provide a convolved cell output.

* * * * *